(12) United States Patent
Akella

(10) Patent No.: US 9,092,802 B1
(45) Date of Patent: Jul. 28, 2015

(54) STATISTICAL MACHINE LEARNING AND BUSINESS PROCESS MODELS SYSTEMS AND METHODS

(76) Inventor: Ramakrishna Akella, Palo Alto, CA (US)

( * ) Notice: Subject to any disclaimer, the term of this patent is extended or adjusted under 35 U.S.C. 154(b) by 133 days.

(21) Appl. No.: 13/586,310

(22) Filed: Aug. 15, 2012

Related U.S. Application Data

(60) Provisional application No. 61/523,782, filed on Aug. 15, 2011.

(51) Int. Cl.
*G06N 5/00* (2006.01)
*G06F 1/00* (2006.01)
*G06Q 30/02* (2012.01)

(52) U.S. Cl.
CPC .................................. *G06Q 30/0256* (2013.01)

(58) Field of Classification Search
CPC ............. G06F 15/18; G06F 5/02; G06F 3/08; G06Q 10/00
See application file for complete search history.

(56) References Cited

U.S. PATENT DOCUMENTS

| 2008/0162132 | A1* | 7/2008 | Doulton | 704/235 |
| 2012/0036130 | A1* | 2/2012 | Light et al. | 707/736 |
| 2012/0191716 | A1* | 7/2012 | Omoigui | 707/740 |

* cited by examiner

*Primary Examiner* — Jeffrey A Gaffin
*Assistant Examiner* — Kalpana Bharadwaj
(74) *Attorney, Agent, or Firm* — Carr & Ferrell LLP

(57) ABSTRACT

Methods and systems for knowledge extraction that involve providing analytics and blending the analytics with analysis of one or more knowledge processes are provided. Knowledge extraction may be based on combining analytic approaches, such as statistical and machine learning approaches. Unstructured data, such as numerical, geo-spatial, text, speech, image, video, data, and music, may be used as input for these processes. The methods and systems may convert this unstructured data into a structured knowledge that has some specific utility to its user. Some embodiments may involve service requests delivery, information and knowledge extraction, information and knowledge retrieval, media mining, marketing, and other uses. Different granularity levels of knowledge and information extraction may be provided. This differentiation may be used for monetization of the service.

20 Claims, 20 Drawing Sheets

FIG. 5

The phone boots up and it does a DHCP [Dynamic Host Configuration Protocol. Provides a mechanism for allocating IP addresses dynamically so that addresses can be reused when hosts no longer need them] request in the native VLAN [virtual LAN]. There it gets an *IP address* [32-bit address assigned to hosts using TCP/IP] and an option that it needs to boot up in the VLAN 40 and that it need to go in trunking [physical and logical connection between two switches across which network traffic travels] mode. Host Server with 2 interfaces [connection between two systems or devices] and one default gateway. When ping *Vlan*-B [virtual LAN] interface an ARP [Address Resolution Protocol. Internet protocol used to map an IP address to a MAC address] request with a source *IP* of *Vlan*-B is sent to Default Router [network layer device that uses one or more metrics to determine the optimal path along which network traffic should be forwarded. Routers forward packets from one network to another based on network layer information] on *Vlan*-A, but Router does not respond to ARP request.

*FIG. 11B*

STATISTICAL MACHINE LEARNING AND BUSINESS PROCESS MODELS SYSTEMS AND METHODS

CROSS-REFERENCE TO RELATED APPLICATIONS

This application claims the benefit of U.S. Provisional Application No. 61/523,782, filed on Aug. 15, 2011, which is incorporated here by reference in its entirety for all purposes.

BACKGROUND

Unstructured and structured data segments, including documents, may contain numerical, text, speech, music, image, video, and other types of data. These data segments, including documents, may contain information which may be useful but difficult for humans and/or computer analytics systems and software to comprehend on direct access. More and more individuals and organizations attempt to extract relevant knowledge and various insights from various sources of data to assist activities they engage in (such as organizational functions), without creating additional burden for themselves or their employees. While knowledge is often a subjective concept on the outset, the value associated with this concept is widely accepted. In some contexts, knowledge may refer to possession of a deep understanding of the inner workings and functioning of activities, steps, components, and temporal and other relationships, (such as social, matrix, and tensor related), within a specific domain, or even more broadly, across domains. Knowledge that has value to a specific individual, user, or organization may include elements that are not commonly available or understood, those that are refined, structured and granulated, and those that are frequently used in several individual or organizational activities.

Humans gain knowledge in natural ways but this knowledge is not necessarily represented in a form that may be reused by machines. This human acquired knowledge may either never be documented or documented in unstructured text or various forms such as data usage patterns for voice, numerical data, text and SMS, images and photographs, video, music, and the like. Reviewing such a compilation and understanding the exact intent behind this data may require interpretation of the language and/or context. A service delivery organization, for example, may use knowledge to address a specific requirement or to solve a specific problem. Of course, data is increasingly being generated by machines, and in immense volumes. For humans, this volume of data is often overwhelming. For instance, marketing personnel are often unable to comprehend the metaknowledge process patterns latent in the data usage patterns of mobile phones (and other similar smart mobile devices). The data in these environments can be available at a greatly detailed level, by user program member, device, application, etc. These meta-knowledge level process extraction tasks can be challenging even for humans that generated the data, let alone machines. Machines can rapidly explore an immense number of possibilities and patterns. Humans, however, have the ability to comprehend the intent and the circumstances under which such knowledge is applicable, which is helpful in creating or updating this knowledge. Machines, on the other hand, are much more constrained in their ability to understand unstructured text or other business patterns such as data usage pattern in a social group, or network, in a similar context. Nevertheless, knowledge extraction and reuse based on human resources alone is not very scalable within organizations, in which ever-increasing products and associated documentation result in an exponential growth of unstructured data, including numerical data, text, image, video, speech, music, etc. Mechanisms to automate or semi-automate the knowledge extraction and reuse process may be needed to assist expensive human resources in achieving enhanced effectiveness and productivity by having machines assist in optimizing human-machine interactions. Conversely, humans may have a role to play in machines identifying meta knowledge processes in real time.

SUMMARY

Provided are methods and systems for knowledge extraction that involve using analytical approaches and combining the analytical approaches with one or more knowledge processes. In some embodiments, these knowledge processes may be related to human-human interaction, device-human interaction, and device-device interaction. Some examples of knowledge extraction are based on combining analytical approaches, such as statistical and machine learning approaches, with business processes and sequences. The disclosed systems may include extraction modules, meta knowledge process based behavior pattern modules, context and intent modules to characterize emergent behavior, others to generate relevance by matching context and intent, recommenders to suggest actions or alerts based on the relevant data and potential user relevance and attribution feedback on the effectiveness of the system alerts on actions in influencing user action, updating of recommender systems actions or policies to incorporate this attribution feedback, pre-processing modules, and human input modules (e.g., a crowd-sourcing module) to extract knowledge. The knowledge may be extracted from structured or from unstructured data types. These may also be implemented in real time, and may rely on in-memory approaches. Some examples of such data types include numerical data, geo-spatial data, social network data, text, speech, image, video, music, and audio. Some implementation examples include product and design processes and services, user data usage pattern mining, service requests delivery, information and knowledge extraction, information and knowledge retrieval, mining of (social and other) media including blogs for information and knowledge extraction, (online and offline) marketing based on information and knowledge extraction, other uses requiring extraction of refined knowledge in any (business or other) process. One embodiment of the present invention may include instructions executed on a processor which extracts process information from data and stores the information in a repository. On receiving or sensing a request, based on an analysis of the request, stored process information may be selected to respond to the request. Certain embodiments of the present invention allow for the creation of a repository based on the analysis of data, which may then be used to automatically respond to requests. The systems and methods may be used in various domains and industry segments and verticals including but not limited to, automotive, aerospace, business and services such as financial, marketing, support, engineering, accounting, human resources, food, social networks and other forms of social and other media, electronics, computers, semiconductors, telecommunications, networking, smart and other mobile devices steel, web, ecommerce, ebusiness, social and other games, healthcare and medical, biotechnology, energy, automation, mechanical, chemical, biological, electrical, oil, gas, petroleum, transportation, mining, automation, manufacturing, equipment, machine tools, engines, and entertainment.

BRIEF DESCRIPTION OF THE DRAWINGS

FIG. 5 is an example of a user interface depicting various data associated with malfunctioning Heating Ventilation Air Conditioning unit, grouped into Function, Failure, Effect, Cause, and Action categories.

FIG. 11B shows an example of KN excerpts from two service requests in accordance with some embodiments.

DETAILED DESCRIPTION

Introduction

Figure 1:
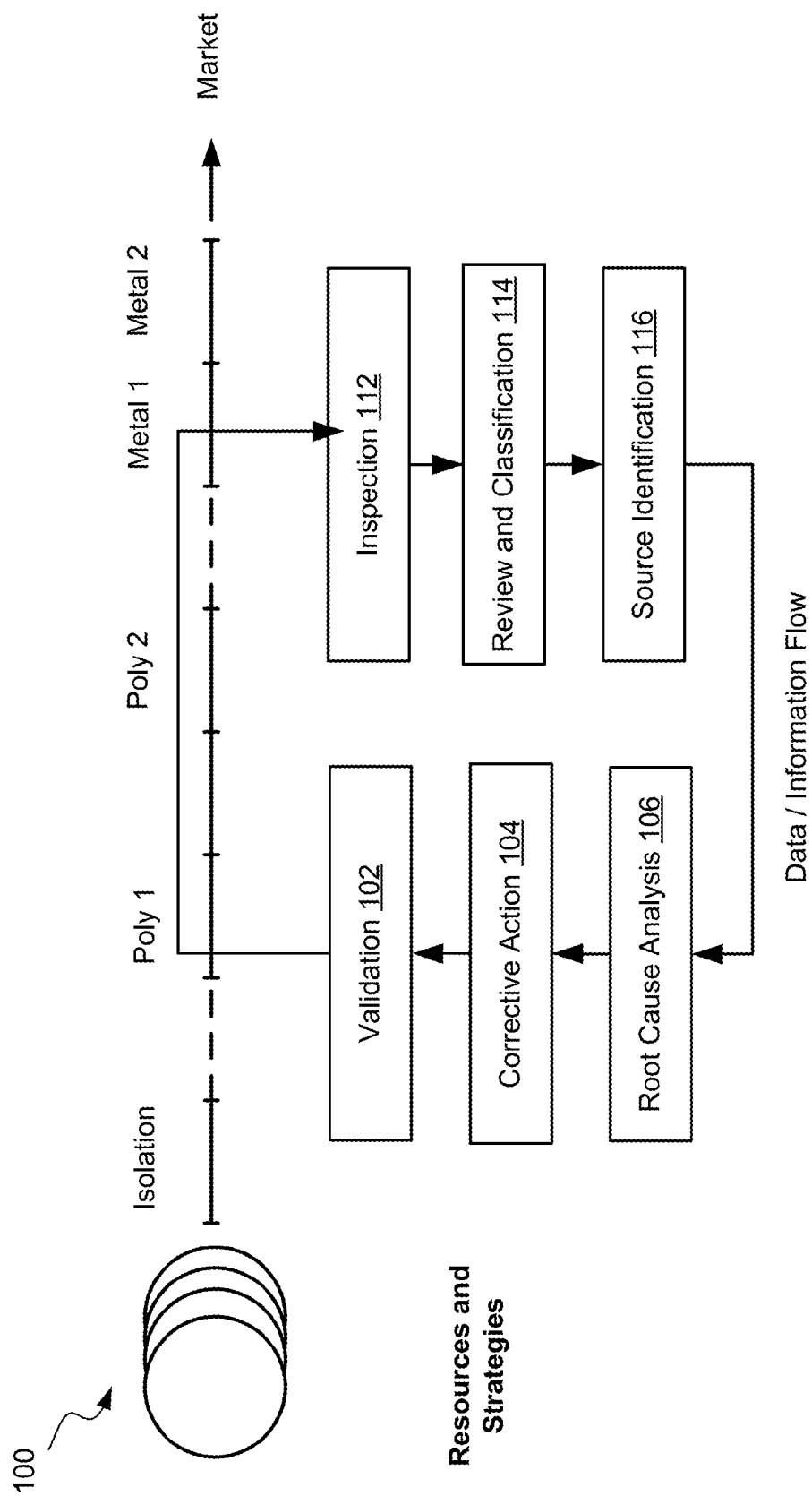
FIGS. 1 and 2 illustrate example key elements driving the yield economics of a semiconductor fabrication facility, in accordance with some embodiments.

Provided are methods and systems for knowledge extraction that involves using analytical approaches and combining the analytical approaches with one or more knowledge processes. These knowledge extraction systems may be implemented for automotive design (e.g., as an automotive design system), for semiconductor yield management or quality control, for telecommunication purposes (having specific data usage associated analysis and functionality), Web Analytics, including social networks, ecommerce, ebusiness, information and knowledge provisioning, action recommendations via recommenders, and other applications further described below. The system and methods implemented using this system may also optimize and significantly enhance the productivity and effectiveness of service centers. More broadly, the described systems and methods may optimize or enhance the effectiveness and productivity of knowledge or information delivery systems, including those which integrate crowd-sourced human and software analytics. Although some of the systems and methods may be described herein with reference to a service center example, the invention is not so limited. Other implementations may be used as well. In one embodiment, a process miner may be included, in order to extract higher level (business, enterprise, web, social, network and/or other) processes, in the data. Such extraction may be done hierarchically and statistically.

The knowledge extraction system may be based on a multisource data system, which means that the knowledge system may receive data from multiple different sources and the data may be in multiple different formats. For example, the knowledge extraction system may accept both structured and unstructured data, often at the same time. Some example of data sources and types include enterprise data, web based data, clickstream data, numerical data, speech, text, image, video, audio, music, and the like. In some embodiments, the knowledge system includes text analytics capabilities. The data types could be analyzed in an integrated fashion by combining various data types, e.g., numerical data, text, speech, or video data types. In some embodiments, there could be sequential, graphical, social, and/or tensor relationships in the received data, which are extracted and used for presentation and further analysis. In some embodiments, the analysis may involve taking into account data context (e.g., source of data, such as email, web, phone), user context (such as being in a rush) and intent (such as purchasing an iPad), and global context (e.g. web and road traffic conditions).

In some embodiments where the knowledge extraction is potentially across different sources or types (which may include one or more of numerical, speech/voice, text, image, video, web clickstream), the data may be separated into different Knowledge Nugget buckets (or Knowledge Processes), types, or categories, based on the (business and/or other) processes (including enterprise, web, social, network, etc.). An exemplary Knowledge Nugget (KN) process may include a problem, cause, and solution. Similarly, an exemplary Knowledge Process (KP) may include multiple problems, causes, and solutions combined into a possibly illogical sequence, caused by out of sequence Problem, Cause, and Solution sequences from several different problems, rather than just one. More broadly, the data may be separated or extracted into relevant, partially relevant on a graded scale, or non-relevant categories. The data separation or extraction may also take into account the task at hand for which the extraction is being performed. The data may be further separated or extracted by a range or binary classification of type, category or process. This knowledge extraction may also be based on extracting the Knowledge Nuggets (KN) and/or Knowledge Processes (KP), including process level patterns, by blending (business, enterprise, web, social, network, and/or other) processes at different levels of granularity, e.g. sentence, paragraph, segment, sub-section, section, chapter, document, and the like. A Process Miner may be used to perform this service. Similarly, the blending may occur across different types of data, e.g. numerical, speech, text, image, video, web, clickstream, and the like, where knowledge extraction is being performed. Also, the knowledge extraction may include sequential and/or temporal patterns, or (social and/or other) graphs (or tensors) latent in the data sources at multiple levels of the (business and/or other) processes. These patterns can also be significantly modified in social and/or collaborative environments, with dependencies occasioned by the nature of the collaboration or interaction in a (business and/or other) process (in the enterprise, web, social, network or other contexts). The resulting and associated extracted KN (or KP) in the above embodiments may be encapsulated as a combined temporal state with various data type components, which may be hierarchical (including by means of hierarchical Bayesian statistical modeling) in nature, possibly with various levels of granularity, patterns, sequences etc. This KN (or KP) capture and matching of the extracted "metadata" of context and intent of any individual or user (resulting in relevant information and action provisioning) could be then be continually updated as more information is available, e.g. in the business, enterprise, social, network, web and/or other contexts. An emergent behavior or prescience engine may be used to perform this process. Some potential embodiments may include a streaming data environment, where global and user context and user intent are continually accumulated. Any implicit or explicit real time request by the user may be met by updating the global (including dynamic social network and user information) context, and updating user context and user intent from both the historical sequence and the new real time streaming data, and then utilizing context and intent matching to provision the most relevant real time information. A recommendation may be made, based on the relevant data so obtained, and the utilization of a recommender, decision engine, retrieval engine, collaborative retrieval engine. or a blended use of all the above. The combination may also be referred to as a recommender for reason of convenience. Additionally, the knowledge of a process may include business, enterprise, web, social, network, or other processes. The knowledge of a process may be extracted by the Process Miner.

The disclosed methods and systems may assist users (e.g. marketing personnel, telecommunication firm employees, or service engineers in service centers) in obtaining pertinent information from, for example, patterns developed from related and already solved problems or service cases when responding to a new request. Such a pattern recognition or analogizing role may be one of the elements of the KN (or KP) aspects described herein. Pattern recognition and machine learning may integrate human input into both (semi-)supervised and unsupervised learning. This learning of patterns and sequences may be performed automatically or semi-automatically. The processes, methods, and approach described herein incorporate the (business, enterprise, web, social, network, and/or other) knowledge processes) into a cohesive unit. The methods and systems may be based on an efficient human-machine combination to derive insights from data (e.g., unstructured data usage, video or text) in order to respond to a user's request. This combination may be important for some applications, such as revenue management system or in service centers, since this combination may allow users (e.g. marketing personnel or service engineers) to capture relevant information, concerning the usage modes and patterns at a semantic and process level at a group or family members in a shared data plan with fixed Gigabytes; this can thus be achieved quickly and accurately, without the need for substantial efforts on their part. In some embodiments, this combination may help with developing a foundation for upper layer applications. The systems and methods may be applied to optimization services involving processing long unstructured data segments or documents, referencing a number of technology and product related terms with implicit inter-relationships, and similar functions. Service delivery may be improved by automating knowledge extraction to allow self-service aspects by end users. The identification and extraction of data usage segments of greater information and other value and relevance to the user (or machine or automated information process), and the removal of the rest of the irrelevant or noisy data or information in the data segment or document, may be very valuable. An understanding of the (business, enterprise, web, social, network, and/or other) processes may help extract the truly relevant and valuable information.

In some embodiments, the systems and methods may include text analytics features to address gaps in the support services function. These features may be based on optimizing usage of human resources and software analytics in the service delivery process. An analyzer component may be provided to handle complex service requests and to present categorized and pertinent information to service agents. Based on this information, a recommender, which is an upper layer application, may be developed to retrieve similar solved service requests, when presented with a new request. Some embodiments of the proposed systems and methods include identifying elements of the diagnostic process underlying creation of service requests. This operation is followed by designing a classifier to decompose the complex service requests into those elements. Such decomposition may provide specific information from the functional perspectives associated with identifying the initial request, reasons for the request, and corresponding solutions. This specific information may assist service agents in acquiring needed knowledge more effectively and rapidly. In some embodiments, a recommender provided on top of the service request analyzer may extend the system functionality for knowledge reuse. For example, the recommender may be used to measure similarity of different service requests for more accurate recommendation of service requests. Alternately, modifications of a retrieval engine, as described earlier for matching context and relevance to produce relevant information, may be used in place of the recommender system, or in conjunction with it.

The systems and methods according to various embodiments are applicable to service centers across multiple domains, including, but not limited to, automotive, aerospace, business and services such as financial, marketing, support, engineering, accounting, human resources, food, social networks and other forms of social and other media, electronics, computers, semiconductors, telecommunications, networking, steel, web, social and other games, healthcare and medical, biotechnology, energy, automation, mechanical, chemical, biological, electrical, oil, gas, petroleum, transportation, mining, automation, manufacturing, equipment, and entertainment and may be configured to cover other business functions of an enterprise or a web service or analytics activity. A business function may include design process and web services and processes, sales, marketing, finance, engineering, accounting, human resources, service, ecommerce, ebusiness, and other processes.

The systems and methods may include capturing, retrieval, and reuse of more refined, structured and granulated knowledge, as well as use of forum threads and semi-automated, dynamic categorization, together with more optimal use of humans and machine learning based software. In some embodiments, recommendation systems based on temporal (business) (sequential, social, tensor) pattern clustering and incentives for experts to permit their expertise to be captured for machine (re-)use may be provided. Furthermore, these recommender systems may use attribution or explicit or implicit feedback. Optionally, randomized experiments or association models may be utilized. The attribution or feedback may include considering the relevance, which indicates whether or not the user responded to the recommendation, and to what extent any action or response by the user can be attributed to the recommendation made by the system. This may allow the recommender to change its recommendations based on these new inputs or response from the user, for the same original data.

Figure 17:
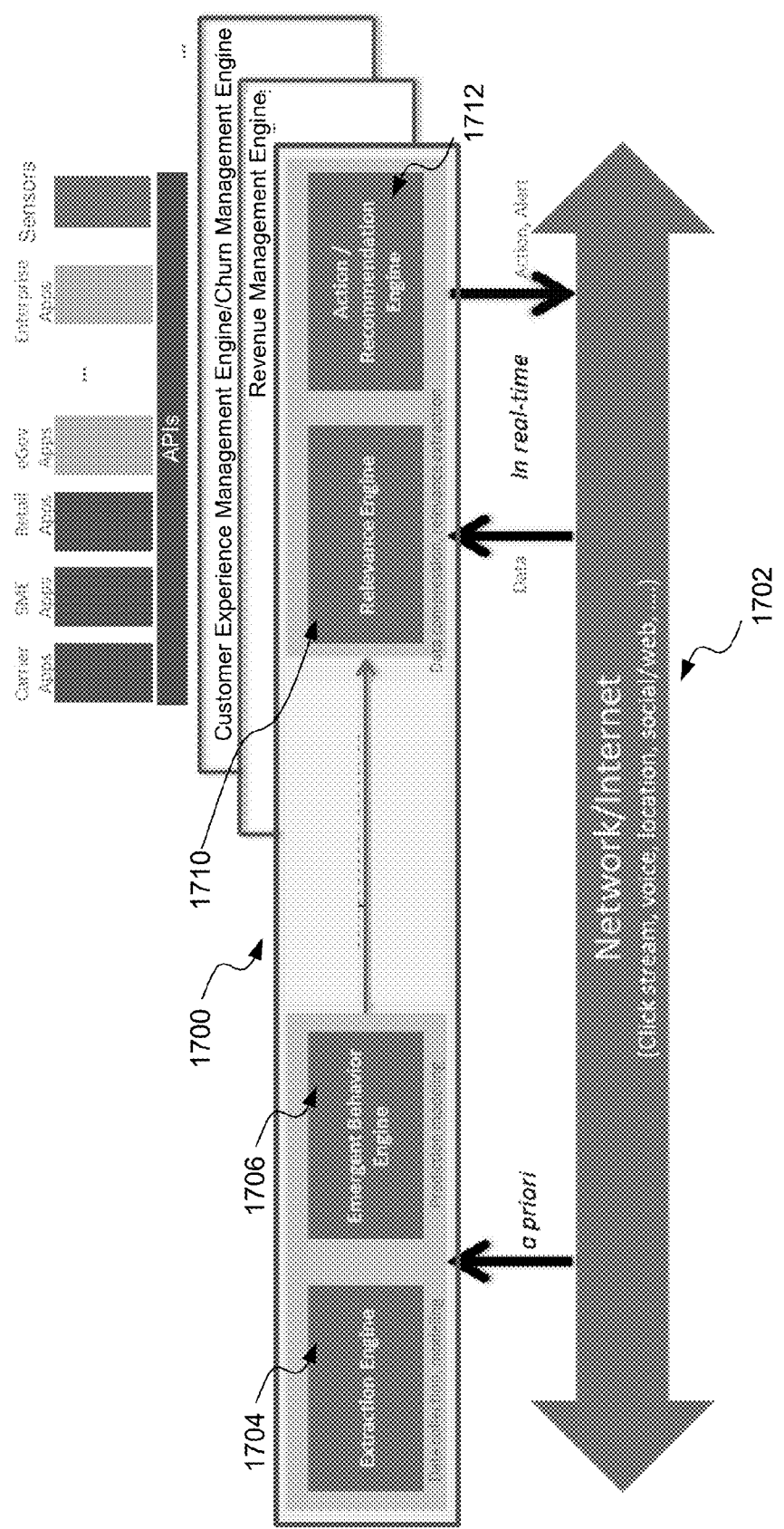
FIG. 17 illustrates an embodiment of the present invention which utilizes an engine to receive and analyze data then provide recommendations.

FIG. 17 illustrates an embodiment of the present invention which utilizes an engine 1700 to receive and analyze data then provide recommendations. The data may comprise historical or a priori data along with real time data. The data may be received from a network/internet 1702 and may comprise click stream, voice, location, social, web, etc. The engine 1700 may include other engines as components, such as an extraction engine 1704, emergent behavior engine 1706, relevance engine 1710, and action/recommendation engine 1712 ("recommender").

The extraction engine 1704 conducts data collection and modeling and may perform business process extraction along with statistical extraction as described herein. Business process extraction may include, but is not limited to, business, enterprise, web, social, network, or other processes. The processes may cover various domains including, but not limited to, semiconductor manufacturing, aerospace system operation, automotive system design, network design diagnostics, telecommunication services, web analytics, enterprise and web search, health care and financial services. Additionally, the extraction engine 1704 may determine the process or domain the data relates to. The emergent behavior engine 1706 performs prediction modeling through analysis of patterns, sequences, context, and intent exhibited by data as described herein.

Optionally, the extraction engine 1704 and emergent behavior engine 1706 may perform as a unit to extract user behavior user behavior from input data and predict user behavior. Such data or predictions may be based on usage (time, frequency, data volume, etc.), application (new applications, downloads, etc.), purchase (spending, frequency, types, etc.), or access (mobile, PC, etc.) patterns.

The relevance engine 1710 refines the extracted data and prediction model, by compressing the data and generating a compressed relevance model. The relevance may be determined through sequential context-intent matching. Optionally, the compressed relevance model may be generated as a sequence of clustering of usage time series, possibly a usage-based predictor, both together based on categorizing users, types, and devices; a pro-active campaign recommender, optimizing value to customer via delight, by spend, sentiment, and termination, etc. The action/recommendation engine may consume data in real time, use the data from the compressed relevance model, and generate actions or alerts. The actions or alerts may include recommendations to users (such as dynamic, social, etc.), prognostic events, etc. Optionally, the engine 1700 may be used as a template and be customized for specific analysis, such as a revenue engine, customer experience management engine, etc. In the overall system, the various engines shown in FIG. 17 may interface with application programming interfaces (APIs), including but not limited to the example APIs and sensors shown in FIG. 17.

Figure 18A:
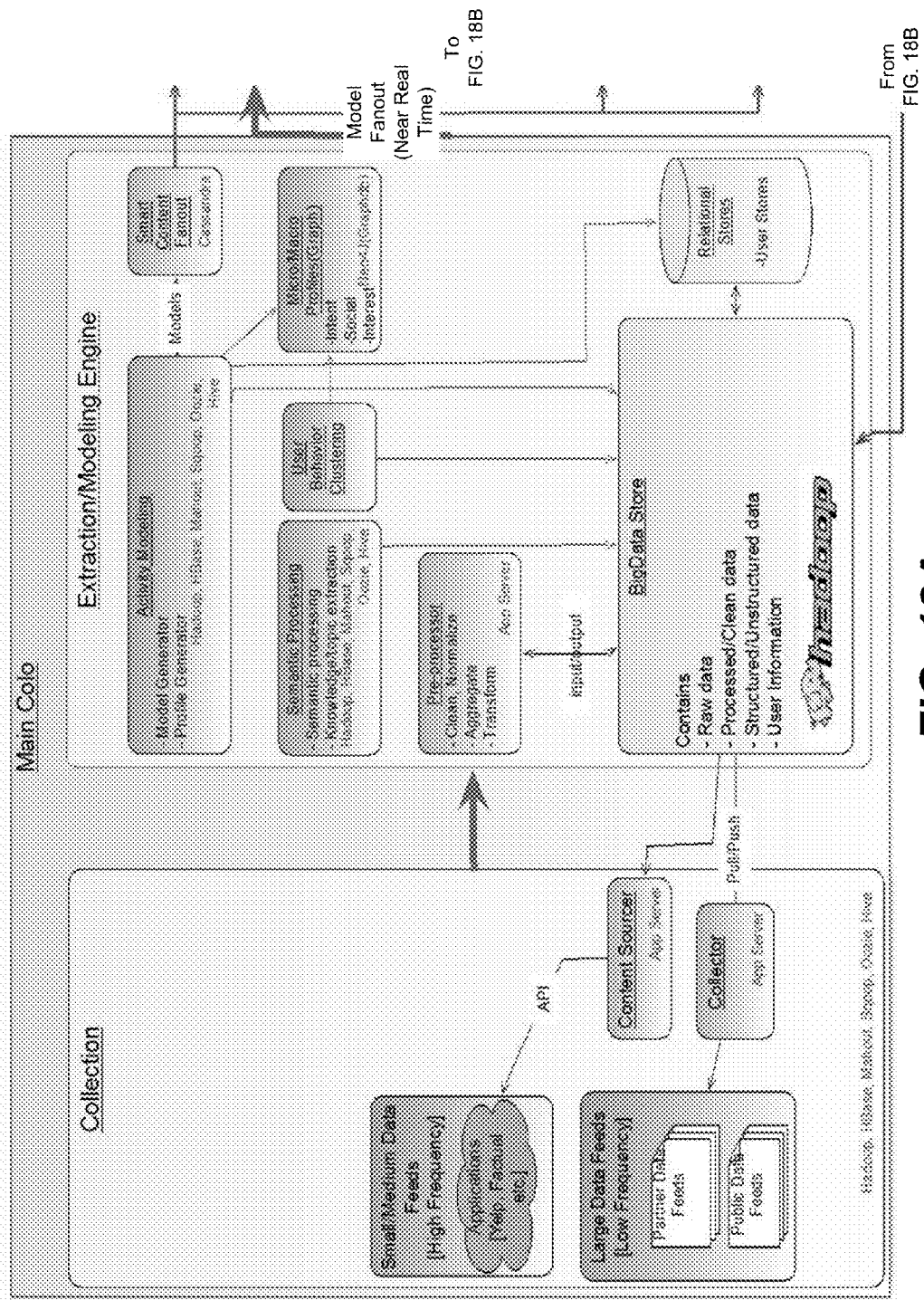
FIG. 18A illustrates a portion of an exemplary embodiment implementing a real time response in combination with large scale data analysis and storage.
Figure 18B:
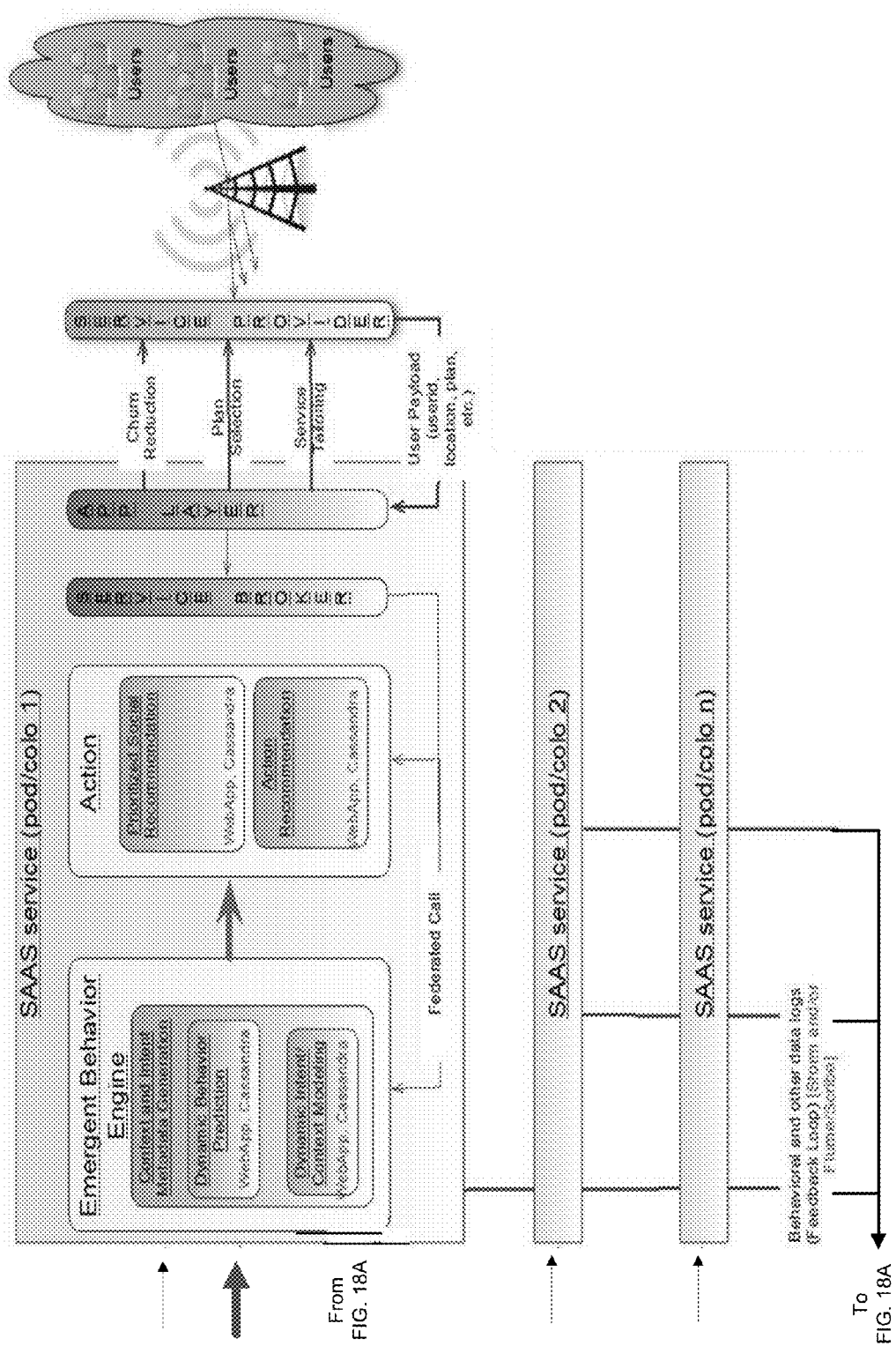
FIG. 18B illustrates a portion of an exemplary embodiment implementing a real time response in combination with large scale data analysis and storage.

FIGS. 18A and 18B illustrate an exemplary embodiment implementing a real time response in combination with large scale data analysis and storage. FIG. 18A depicts a Main Colo comprising a Collection module and an Extraction/Modeling Engine. The Collection module may comprise Small/Medium Data Feeds, Large Data Feeds, a Content Sourcer, and a Collector. The Small/Medium Data Feeds may receive data at a high frequency from sources such as applications, e.g. Yelp, Factual data, etc. The Large Data Feeds may receive data at a low frequency from Partner or Public data feed sources. Data Feeds may interface with the Content Sourcer or Collector through APIs. The Content Sourcer or Collector may be an application server. The Collection module provides its data to the Extraction/Modeling Engine. The Collection module may be implemented with Hadoop, HBase, Mahout, Sqoop, Oozie, Hive, or other similar technologies.

The Extraction/Modeling Engine may be comprised of an Activity Modeling, Smart Content Fanout, Semantic Processing, User Behavior Clustering, Micro/Macro Profiles (Graph), and Pre-processor modules. The Extraction/Modeling Engine may also include a Big Data Store and a Relational Store.

The data from the Collection module is received by the Pre-processor module which may process the data for use by the Extraction/Modeling Engine through various methods including cleaning, normalizing, aggregating, or transforming the data. Additionally, the Pre-processor module may receive input from and provide output to the Big Data Store.

The Big Data Store may contain raw data, processed/clean data, structured/unstructured data, and user information. Optionally, the Big Data Store may be implemented or supported by Hadoop. Data may also be shared between the Big Data Store and the Relational Store. The Relational Store may contain User Stores.

The Semantic Processing module may receive input from and provide output to the Big Data Store. The Semantic Processing module may perform semantic processing or knowledge extraction on the data provided from the Big Data Store. The Semantic Processing module may be implemented with Hadoop, HBase, Mahout, Sqoop, Oozie, Hive, or other similar technologies.

The User Behavior Clustering module may receive input from and provide output to the Big Data Store and the Macro/Micro Profiles (Graph) module. The User Behavior Clustering module may analyze groupings of data or potentially group data pertaining to user behavior as described herein.

The Activity Modeling module may receive input from and provide output to the Big Data Store and the Relational Store. The Activity Modeling module may comprise a model generator and/or a profile generator. The Activity Modeling module may be implemented with Hadoop, HBase, Mahout, Sqoop, Oozie, Hive, or other similar technologies. Additionally, the Activity Modeling Module may interface with the Macro/Micro Profiles (Graph) module and provide models to the Smart Content Fanout module.

The Macro/Micro Profiles (Graph) module may receive input from and provide output to the Activity Modeling and User Behavior Clustering modules. The Macro/Micro Profiles (Graph) module may create graphs based on intent, social, interest, etc. The Macro/Micro Profiles (Graph) module may be implemented with Neo4J (Graphdb) or similar technologies.

The Smart Content Fanout module receives models from the Activity Modeling module. The Smart Content Fanout module distributes the models to one or more SAAS service modules or units. The model fanout may occur near real time. The Smart Content Fanout module may be implemented with Cassandra or similar technologies.

Turning to FIG. 18B, the SAAS service modules or units may also be known as pod/colo. There may be a varying number of SAAS service modules or units from 1 to n. The SAAS service module may comprise an Emergent Behavior Engine, an Action module, a Service Broker, and an App Layer. The Emergent Behavior Engine receives the model from the Extraction/Modeling Engine. The Emergent Behavior Engine may comprise a Content and Intent Metadata Generation module with embedded Dynamic Behavior Production and Dynamic Intent/Context Modeling modules. These modules may be implemented with WebApp, Cassandra or other similar technologies. The Context and Intent Metadata Generation module may predict user behavior or perform intent-context matching as described herein.

The Action module may comprise Prioritized Social Recommendation and Action Recommendation modules. These modules may be implemented with WebApp, Cassandra or other similar technologies. The Action module provides recommendations based on the data, models, and predictions as described herein. The Service Broker receives data from the App Layer and may perform Federated Calls to the Emergent Behavior Engine and the Action module. The App Layer may provide output recommendations, such as Churn Reduction, Plan Selection, Service Tailoring, etc., to the Service Provider and receive User Payload data, such as userid, location, plan, etc.

Optionally, the SAAS service modules may provide feedback to the Big Data Store comprising behavioral or other data logs. The feedback loop may be implemented with Storm and/or Flume/Scribe or other similar technologies.

In summary, also described herein are systems and methods, which may comprise one or more of the following components.

Extracting knowledge; the knowledge extraction may include Knowledge Nuggets and/or Knowledge Processes. These may include sequential temporal, structural (including sequence, social, graph, tensor, hierarchical, statistical, Bayesian, and/or other) patterns. This may also include a Knowledge Nugget and/or Knowledge Process Miner. This may also include or coordinate with a prognostic event engine to anticipate and respond to stochastically changing systems, which may incorporate various forms of extraction based on Knowledge Nuggets or Processes. This Extractive Engine effort may be termed a Process Miner.

Identifying world context, user context, and/or user intent, which may be achieved by utilizing this knowledge extraction based on Knowledge Nugget and Process identification. This context and identification may be performed sequentially, in parallel, socially, in a network, coordinated, decomposed, and/or other ways. This effort may be termed an Emergent Behavior or Prescient engine.

Identifying and/or generating relevance information by matching context and intent, and may do so sequentially, temporally, socially, network, and/or other ways. This relevance identification or generation may be provided to the user as smart alert, ranked or portfolio set of information or knowledge choices, or held over for additional processing. This effort may be termed a Relevance Engine.

Generating recommendations; the recommendations may be based on context-intent matching, or on a combination with co-reference systems, which may include collaborative filtering systems, and temporal recommender systems. These systems may be termed a Recommender for ease of discussion. A recommender may incorporate feedback from users through attribution modeling, to modify recommender system policies.

The components described herein may be combined and integrated into various methods and systems. The methods and systems may also occur in real time, and may have data coming in from many sources including applications and sensors, and this data may be of many types. The systems and methods may also include generating and updating the Knowledge Asset, which may be continually capturing one or all dimensions of the data coming from many sources and of many types.

Semiconductor Process Examples

Embodiments of the systems and methods may be utilized for network services and knowledge extraction from service requests. Furthermore, these systems and methods may be extended into many new domains including, but not limited to, semiconductor manufacturing, aerospace system operation, automotive system design, network design diagnostics, telecommunication services, web analytics, enterprise and web search, health care and financial services. In some embodiments, the systems and methods may be configured for use for other business functions in the enterprise.

Understanding and explicit use of the business and other types of processes using machine learning and, in some embodiments, Bayesian statistics, is provided. Specifically, identification of meta-level and semantic-level processes is provided. These processes may possess sequential, temporal, or social graph structures.

Several examples of various domains are described. These examples may include identifying key features of similarity and difference and to indicating the context and value obtained by the fruitful blending of these areas. These are intended to serve as examples to provide some additional context.

Figure 2:
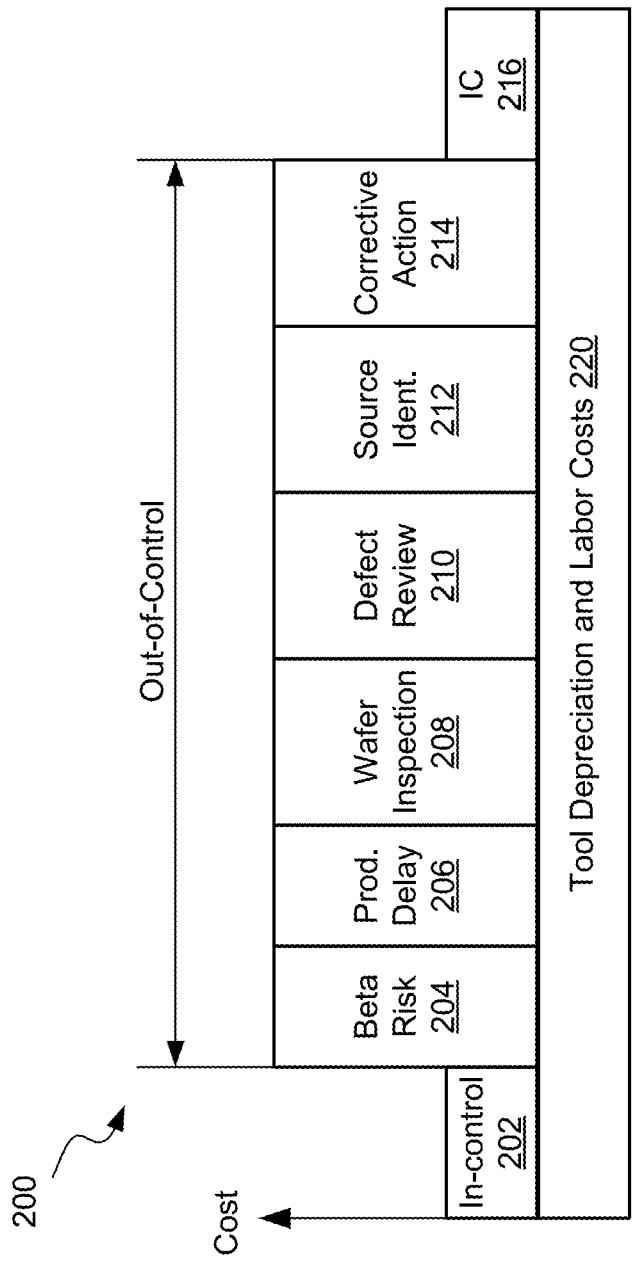

The key elements driving the yield economics of a semiconductor fabrication facility, often referred to as a fab, are outlined in FIGS. 1 and 2. Each fab may typically cost over $3 billion and has 400-500 process steps, corresponding to the various levels or layers of a semiconductor chip. Defects (or parametric problems) are generated at various layers (levels or stages), such as Poly 1, Poly 2, Metal 1, and so forth, and could directly or subsequently cause potential yield losses due to opens, shorts, or parametric impact on yield. These yield losses can only be detected after several weeks, when definitive yield testing occurs at the end of the fab line. Consequently, there is extensive monitoring and review at each stage, to identify defect and parametric problems which can potentially cause yield losses. The "Yield Learning Loops" are indicated in FIG. 1. They cover the various process steps of Yield Management (the term used in this context for process learning) including Inspection 112, Review and Classification 114 (of the defects by type), Source Identification 116 (to identify the source of yield loss causing defects), the Root Cause Analysis 106 (to identify the cause of the defect problem leading to yield loss), Corrective Action 104 (to address and fix the issue), and the final Validation step 102 (to ensure that the Corrective Action worked).

FIG. 2 indicates the economic impact of these steps. They all have a beneficial value. The less time they consume, the quicker the defect or parametric problem is identified and fixed. In addition to the machine time for the Yield Management steps, there is significant time required for the human processing of the data, and review of text generated at each step. For instance, problem descriptions in an ongoing step could be matched with descriptions in previously completed and compiled QC (Quality Control) notes. In fact, each of the Yield Management process step text descriptions at any given Yield Management process step for a given, new QC note could be matched with corresponding numerical and text descriptions of various process steps in previously compiled QC notes. Of course, these descriptions are not always well separated and often mixed up. The engineers write up summaries of their impressions and understanding, and managers work on reviewing the notes by engineers manually for the most part, with the objective of matching these current problems, causes, and solutions with previously solved and compiled defect and parametric problems.

The proposed methods and systems enable an approach where the text, numerical, possibly image and video data of a given QC note has to be processed through a combination of human and machine (learning and software analytics including Bayesian statistics) to achieve the identification of the meta or semantic process of interest and concern, with a view to match this with previously resolved and compiled QC notes (or "stories"). The basis for this system design is the desire to increase human productivity through effective combination and coordination with algorithms. This requires a knowledge extractor, which extracts Meta or semantic process level Knowledge Nuggets (KN) (or Knowledge Processes (KP)), which may be from numerical, text, image and/or video data. Note that process extracts or constructs encapsulations of Knowledge Nuggets (KN) (or Knowledge Processes (KP)), based on (business, enterprise, web, social, network, and/or other) process modeling of multi-type, multi-source data. In addition, a Decision Engine, possibly a Recommender System, which uses this Knowledge Nugget (KN) information to provide a ranked (prioritized) list or portfolio of the most relevant processed QC note and problem which is best matched to a new problem, is required to meet the needs of the Knowledge Engineers engaged in this activity (the Yield Management Engineers and Managers).

Automotive and Aerospace Process Examples

Figure 3:
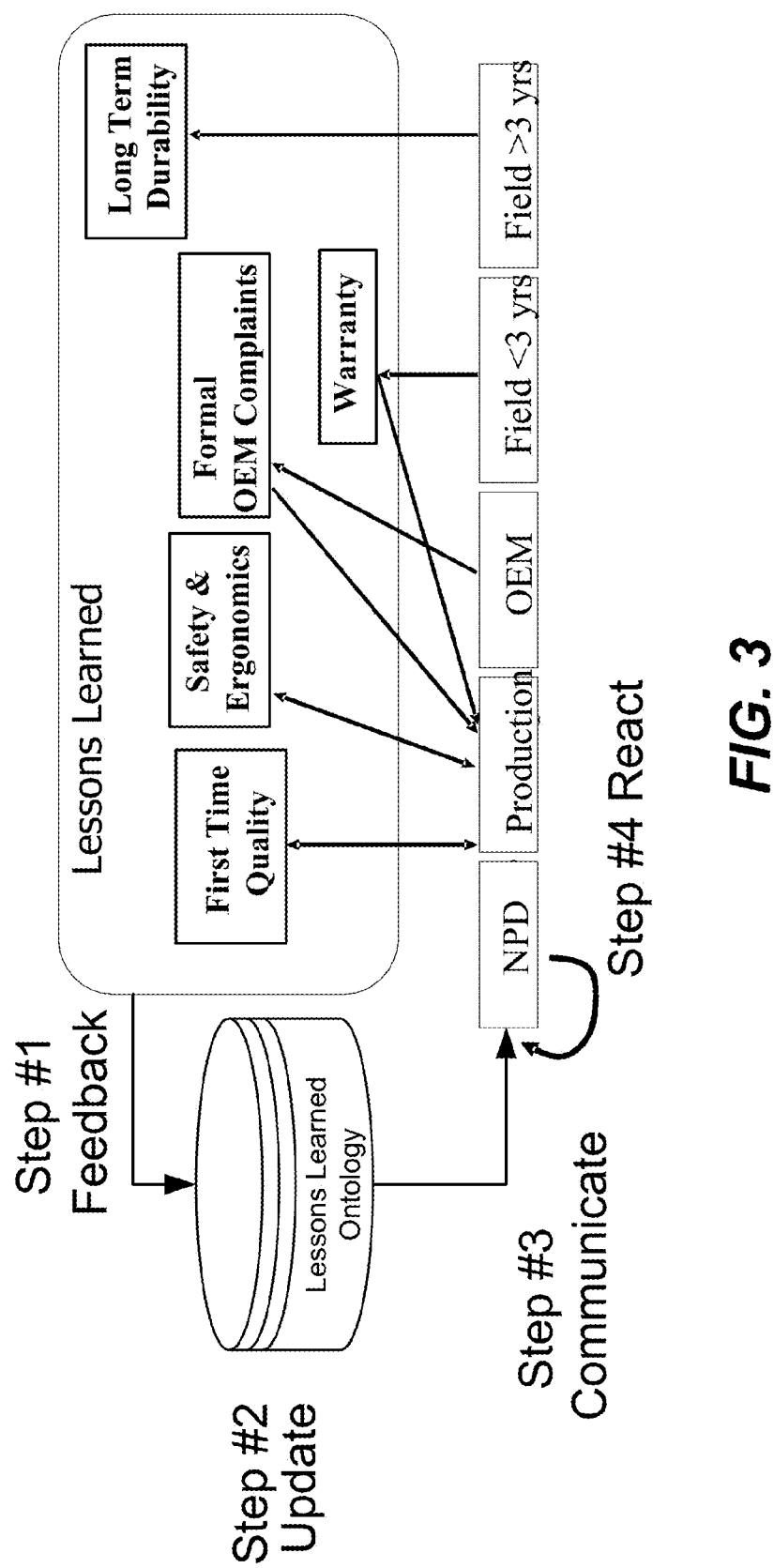
FIG. 3 is a schematic of a triggered lessons learning process in an automotive product development context, in accordance with some embodiments.

A design process context in the automotive industry, where the needs for a Knowledge Extraction and Decision Engine/Recommender System are very similar to those in the previously discussed context and domain, is described next. FIG. 3 is a schematic of a triggered Lessons Learning Process (TLP) in an automotive product development context. Here, feedback, from the ongoing production and use process, is used to tune the design changes. This feedback utilizes the lessons learned created by downstream personnel. Note the nature of process flows, once a trigger incident of a magnitude that warrants action is observed. The lessons learned as a result (e.g. identifying and fixing a defective valve) are created by a group of individuals; these are then placed as an ontology model in a database, as performed in an update step. These lessons are communicated to New Product Development (NPD). A staff group (which is in essence a group of Knowledge Engineers) extracts and condenses the lessons into a (business) process of function specification, failure mode, root cause, corrective action, and the consolidation into a lesson learned. Optionally, the information contained in the lessons may be incorporated into a product under development.

Figure 4:
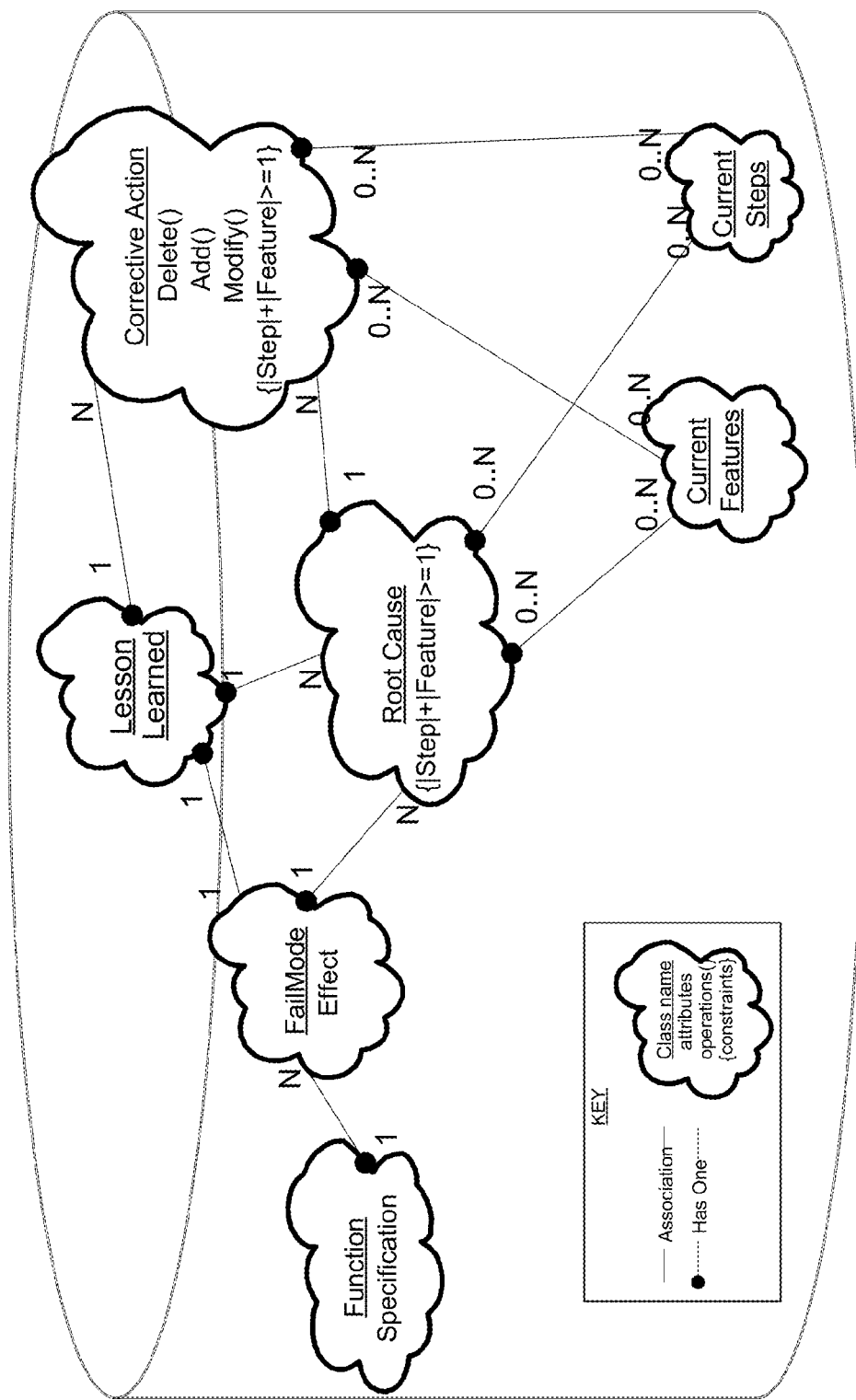
FIG. 4 is a schematic illustration of extracting and condensing the lessons learned into a process of function specification, failure mode, root cause, corrective action, as well as consolidation of the lessons learned.
Figure 5:
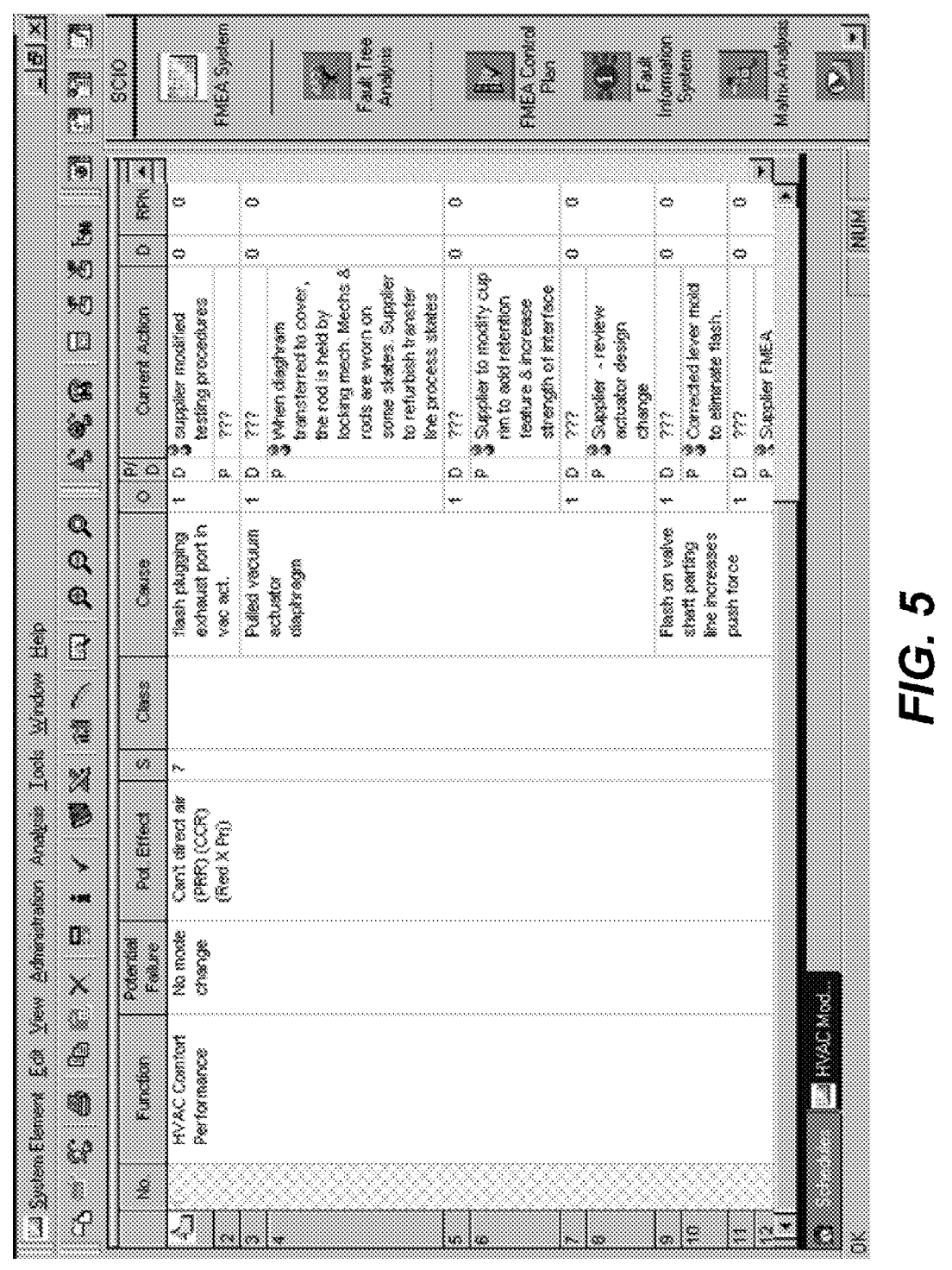
Figure 6:
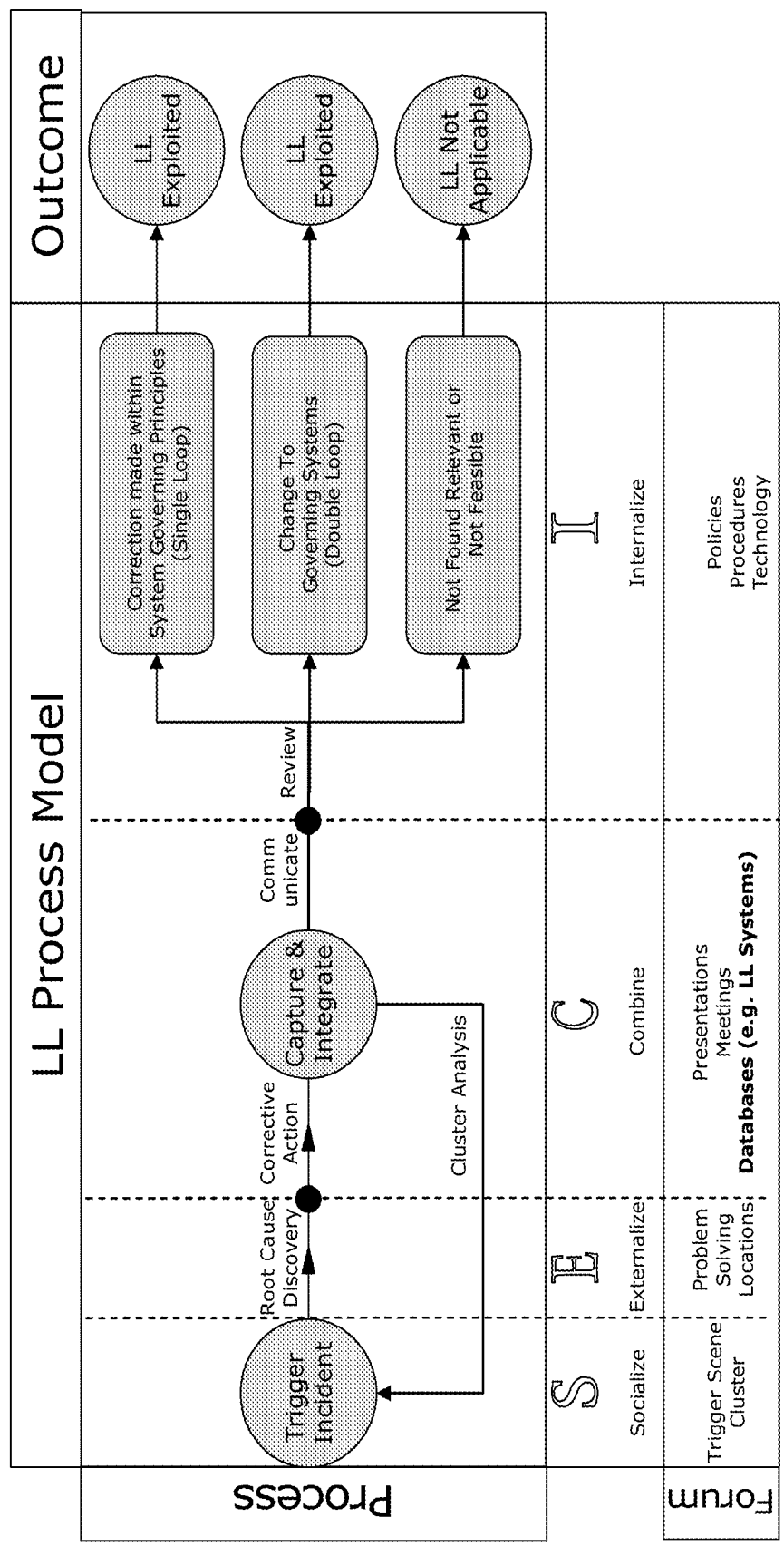
FIG. 6 illustrates conceptualization of the processes that may be applicable to professional forums, social forums, and other forms of human-to-human interactions, in accordance with some embodiments.

A schematic outline of these operations and processes is illustrated in FIG. 4. Much of this comes from numbers, text, images, and video. An illustrative example of a malfunctioning HVAC (Heating Ventilation Air Conditioning) unit is described in FIG. 5, where the choices available at each of the process stages: Function, Failure, Effect, Cause, Action, and the like. FIG. 6 indicates a broader and more sophisticated conceptualization of the processes. In this example, the forums where the issues are discussed and acted upon are more fully identified and described. These might extend into web based social forums as well. The table below indicates the associated productivity gains and efficiencies in lessons learnt transfers and usage (or application) in Product Lines I, II, III, and DOT/NTSB, when compared with systems not exploiting the design process extraction, such as Divisions A and B.

TABLE 1

Learning Sub-process Assessment, Outcomes, and Productivity Gains

| | Division A | Division B | Product Line I | Product Line II | Product Line III | DOT/NTSB |
|---|---|---|---|---|---|---|
| Year Started | 1998 | 2000 | 2001 | 2001 | 2001 | 1967 |
| NC | 847 | 428 | 206 | 153 | 117 | ~12,000 |
| Creation Rate NC/Years | 141/yr | 107/yr | 69/yr | 51/yr | 39/yr | 353/yr |
| NT | 453 | 239 | 182 | 139 | 96 | * |
| Transfer Eff NT/NC * 100% | 53% | 55% | 88% | 91% | 82% | * |
| NA | 12-62 | 0-31 | 73-105 | 59-91 | 27-55 | * |
| Application Eff NA/NT * 100% | 3-14% | 0-13% | 40-58% | 42-65% | 28-57% | 82% |

Table 1 includes noticeable similarity with the previous semiconductor example and some differences. The focus is more on enhancing the product design process rather than the enhancement of the process quality and learning. The similarity lies in the importance of identifying and exploiting a business process in the data (including numerical, text, image, video, speech and other data) to extract refined knowledge. This refined and relevant knowledge can then be used, by additional processing by a Decision (and/or Recommendation) Engine, to provide a ranked list or portfolio of best matching options from a set of previously solved problems and lessons learnt documents, for a new problem.

Aerospace design and production process management is very similar to the semiconductor and automotive process management. While the context is similar, some difference lies in a lower volume of far more complex and sophisticated items being designed and manufactured. The need is still for an effective and effective machine-assisted analytic system, which can extract the essential and core knowledge pertaining to the key (business and/or other) processes, in conjunction with human experts. There is a further need for a decision engine (including and/or recommender system) to provide a ranked list or portfolio of results which best match the current problem the user is trying to solve, or meet the need of the user.

Medical Records Process Examples

Another area for application for the proposed methods and systems are Electronic Medical Records (EMRs). The KN (or KP) extraction and decision engine (and/or recommender) processes are very similar to those for the semiconductor and automotive environments. These EMRs consist of both structured and unstructured data about patients, including in-patient (e.g. ICU—Intensive Care Unit) and outpatient, or both, and payer-payee information records. The data may have numerical, speech, text, image, video, payment, and other components, and could be a combination of structured and unstructured data. The objective in this context is to match a current patient EMR with a database/knowledge base of other (anonymized) patients, to obtain the closest (ranked list or portfolio of previously processed EMR information at an anonymized, metadata level) matched by disease symptoms, disease, cause, and remedy. In addition, the objective may also be monitoring the patient state to detect, alert, and act (intervene) prognostically and diagnostically, in terms of medical treatment. This might require identifying the interleaved patterns at a (business or other process) level, including sequences of actions of patients, users, doctors, etc., such as reading, browsing medical records, web portals, visits, actions, treatment, and responses. The matching and presentation of ranked or prioritized lists, alerting and action (interventions) may require the use of search (retrieval) or decision engines (and/or recommender systems) which also incorporate sequential (including temporal), social (graph and other), Knowledge (Process) Nuggets at different levels of granularity, and possibly incorporating multiple data sources and types.

One embodiment may also require the identification and construction of a state based on extracted information from all the medical sources (including EMRs from every source, where available, medical data not in EMRs, medical research data, clinical trials data, etc.). This state consequently combines both data types such as numerical, text and image, and patterns at the Knowledge Nugget (or Knowledge Processes) level. That is, the Knowledge Nugget (or Knowledge Process) may need to captured as a dynamic state which contains a compressed and relevant set of sequence information, including that extracted from numerical data, text, speech, image, video, plus data concerning vitals, labs, and doctors and nurses notations and annotated text, etc. In mining medical or healthcare records, the patient visit and treatment process could potentially result in an underlying process which will need to be identified, and the then extracted, stored, retrieved and matched with new requests or records, to find similar disease symptoms, causes, and effective treatments. This match may utilize the integrated state and sequence. One implementation may include numerical data, text, image, speech, or video. Another implementation may include sequence information at the higher knowledge process level (once identified), e.g. the main treatment steps for cancer.

Telecommunications and Web Analytics Process Examples

Web analytics environments systems, including telecommunications and personalized intelligent phone and devices, present related but different needs. However, the fundamental need still remains the combined human-machine learning-analytics-statistics extraction of the latent (business and/or other) process latent in a data segment.

The following situation will be briefly explored. A user purchases a social plan of several devices for his family, which includes of several individuals. Each of them may be using one or more of the devices, and using one or more applications on each device, perhaps collaboratively. The service provider needs to dynamically provide information to the users in terms of alerts, and on options and recommendations on application usage allocation of remaining data usage capacity. The recommendation concerns possible choices of remaining data capacity usage, user by user, device, application, based on mined and learnt user needs. This alert and recommendation may be based on mining the usage patterns at different levels of granularity, again exploiting the personalized, web, business, enterprise, social, network and/or other types of process, possibly including the social interaction and collaboration process. This requires analysis of a variety of other users and their implicit social graph of interactions, as well as any explicitly declared social networks.

For example, consider the data usage patterns of a primary user, in a mobile telephone carrier or operator. The primary user is taking part in a shared data plan with multiple members. Each member is using one of the multiple devices which are part of the plan, all sharing usage per month, and the (business, enterprise, web, social, social network and or other) processes latent in these data usage patterns. There could be segments of time with no usage. There could be activities which concern usage of business products, e.g. Microsoft Office, Word, Powerpoint, or Excel. Other activities may include listening to music, video streaming (for educational, recreational, or social purposes), children's social games, uploading, downloading or tagging photographs, backing up data, etc.

Given a data plan with a monthly usage limit, the user may wish to understand the current usage at a more semantic level than the standard message which states "You have just used up 25% of your monthly allocation". The mere usage by device, member, and type of data (e.g. music, video) or application (Word), may not be sufficient for efficient extraction of knowledge, when the objective is to obtain or provide guidance on the usage at a higher or sematic or meaningful level. For instance, the interest may be in understanding whether the consumption was for "useful" or "fun" activities. The reason for this interest or intent is to then allocate remaining capacity to the (possibly rank ordered) useful activities, and give up (rank ordered) "fun" activities, as the possibility of running out of budgeted capacity arises, and can possibly be quantified as a probability. Even in "fun" activities such as Social Games and Video Movies, there could be (an individual user) perceived preference ranking of these, which could be learnt through an automated process, and a possible minimal interaction with the user, to learn the (business, enterprise, web, social network and/or other) processes. This could be achieved by means of explicit use inputs, or implicit inputs based on certain responses. This exploitation of the (business, enterprise, web, social network and/or other) latent processes is beneficial to the summarized extraction of highly relevant and pertinent knowledge in these systems. Specific approaches to extract these patterns may consider events and times corresponding to the start and end points of a type of usage, e.g. social game, educational video, and also the set of users and overlap periods. The set of users and overlap periods may indicate the social structure latent in these processes. For instance, social games or videos watched by the family or friends, with text, email, or tweet exchanges have a "shared family time and discussion" knowledge process context, rather than simple individual viewings. Consequently, such viewings may initially be assigned a higher priority of retention when running out of capacity, than social games by younger children alone. A video (including audio and text) bag of words models may be developed to separate out low activity and high activity video segments, and comedy, social, violence, horror, and other (sub-) genres etc. Social terms and context can be obtained from human input and/or domain dictionaries. Following this, methods similar to those indicated herein may be applied to develop extraction and recommendations concerning a prioritized list of retention video types, when running low or out of monthly data allocation. Similarly, adaptive schemes, including adaptive data sampling, may be helpful in obtaining pertinent or relevant knowledge process data more rapidly when events, activities, or processes of interest are under way. Specifically, the disclosed methods may sample more frequently during more informative periods with a larger number of relevant events or those of interest are observed, and less frequently when less informative events are observed. The mathematical methods for adaptive sampling may update sampling frequencies and/or probabilities accordingly. These may be Hierarchical Bayesian or other models. The described embodiment extends to knowledge discovery in these types of possible situations, where the possible or potential identification of a latent knowledge process, either explicitly or implicitly, could potentially result in a dramatic reduction in irrelevant data, and a corresponding increase in relevant and pertinent knowledge and information extraction, storage, retrieval, and delivery.

This usage may also have patterns or sequences of activities or usages by type, application, etc. Typically, machine learning and statistics also consider and obtain the patterns, to obtain relevant information more effectively. However, they have typically not been exploited in business, enterprise, web, social network and/or other latent processes at the higher level. For instance, consider collaborative meetings in a firm, or a set of friends who are working reading and reviewing books by authors writing in a genre, in a specific generation. Identifying this higher level latent collaborative process may be of interest to identify and exploit in data and information extraction and compression. This is in contrast to lower level detailed sequences of action. In this general context, the "state" including this compressed, higher level construct of "process" has not been fully understood or exploited previously. This state may also include sequential patterns of extracted information organized by the knowledge process, where types of data such as numerical, text, video, music, photo images, and their usages may be combined in a manner which provides insight of value to the user. This state may be based on sequential or other models, which may in turn be based on Hierarchical Bayesian or other models for data segment component features, including but not limited to terms, image features, video features, speech features, music features, etc., identified and extracted in data segments and/or documents which have been provided or browsed by the user, and have been identified by the user and/or the system, either implicitly (through extended viewing or otherwise) or explicitly, as relevant or non-relevant. This extraction may be based on Bayesian Logistic regression or other models, which model the relevance of the data segment or document as a function of the data segment features, which may include terms, and may thus identify the features or terms to include. The state may also be based on a compressing these data segment component features effectively. For instance, a large state space of terms may be compressed to a smaller one; this compression may be mainly based on the distance of the features in the data segment, e.g. terms in a new data segment or document, to previously identified relevant and non-relevant data segment (or document) sets. These relevant and non-relevant sets may have been sequentially identified.

Another aspect of data reduction also occurs in the context of telecommunication networks. Often, there is degradation of the network, gradually or abruptly, which manifests itself as poor quality in certain regions. This change may depend on the region. It would be most desirable to have the quality of service (QoS) be high. Thus, anomaly detection methods may be utilized to detect and take proactive (not just reactive) action. This may require anomaly tracking and detection models which are prognostic in nature, and can incorporate dependencies on features such as geo-location. There are three elements that may be utilized: (1) data compression to obtain relevant data, through appropriate process identification, focusing on events of interest, and using adaptive sampling, as described earlier, (2) incorporating hierarchical Bayesian models, by geo-location and social network features, of other users in the same area to triangulate or calibrate signal and call quality issues, and (3) incorporating the attribution of feedback model, which determines whether the action taken to address quality issues, using a recommender, was effective or not, and modifying the solution for other users, using a attribution or relevance feedback based recommender system. The methods and systems disclosed here may be based on prognostic approaches, which may use Bayesian and/or semi-Markov processes to identify system degradation and potentially optimal action and interventions. These may optimally trade-off the risks of early and late detection, alert, and preventive or repair actions. They may also incorporate approaches for denoising the date by separating the various components into relevant and irrelevant.

Another issue in the context of mobile operators is the presence of various applications on the mobile device. Another embodiment may include the unique ability to extract context and intent and fuse them from many sources, types, and applications to provide relevant information. The context and intent objects can be continually grown, with matching via the retrieval, recommender, or combination engine to provide highly relevant information in real time. The extracted context and intent may be retained in memory for very fast real time provisioning of highly relevant information. The sources and data may include the data through the operator, email, Google, Facebook, social media websites, internal websites, forums, wikis, etc. The generation of relevant information may be based on matching in real time the context and intent in real time, using search or resemblance approaches, or recommender approaches.

Furthermore, the attribution modeling, retrieval or recommender integrated with collaborative filtering, and the extraction of knowledge from various sources including social media websites and forums, using the methods described herein and in conjunction with statistical methods, can be used to both evaluate the effectiveness of ad marketing campaigns, and to provide highly effective ads. Thus, the information extraction techniques contained herein can be blended to be very powerful tools for highly effective online advertising. The use of the compressed data in-memory may enable achieving a tremendous speed increase, allowing for a real time response. The attribution model based feedback may be more broadly used with the recommender, for a broader set of alerts or action recommendations, in any new situation. The recommender may be modified, from being a static one, to one with open loop feedback based on updates, or a closed loop feedback, based on updates and an assessment, estimation, and incorporation of the impact of the feedback on the recommender's subsequent recommendations. This may be achieved through sample path based or other approaches for fast recommender computations, with sketch methods for principled approximations to speed up value function, Q-function and other computations, and action/recommendation determination using these values.

Examples of Knowledge Extraction and Reuse

Figure 7:
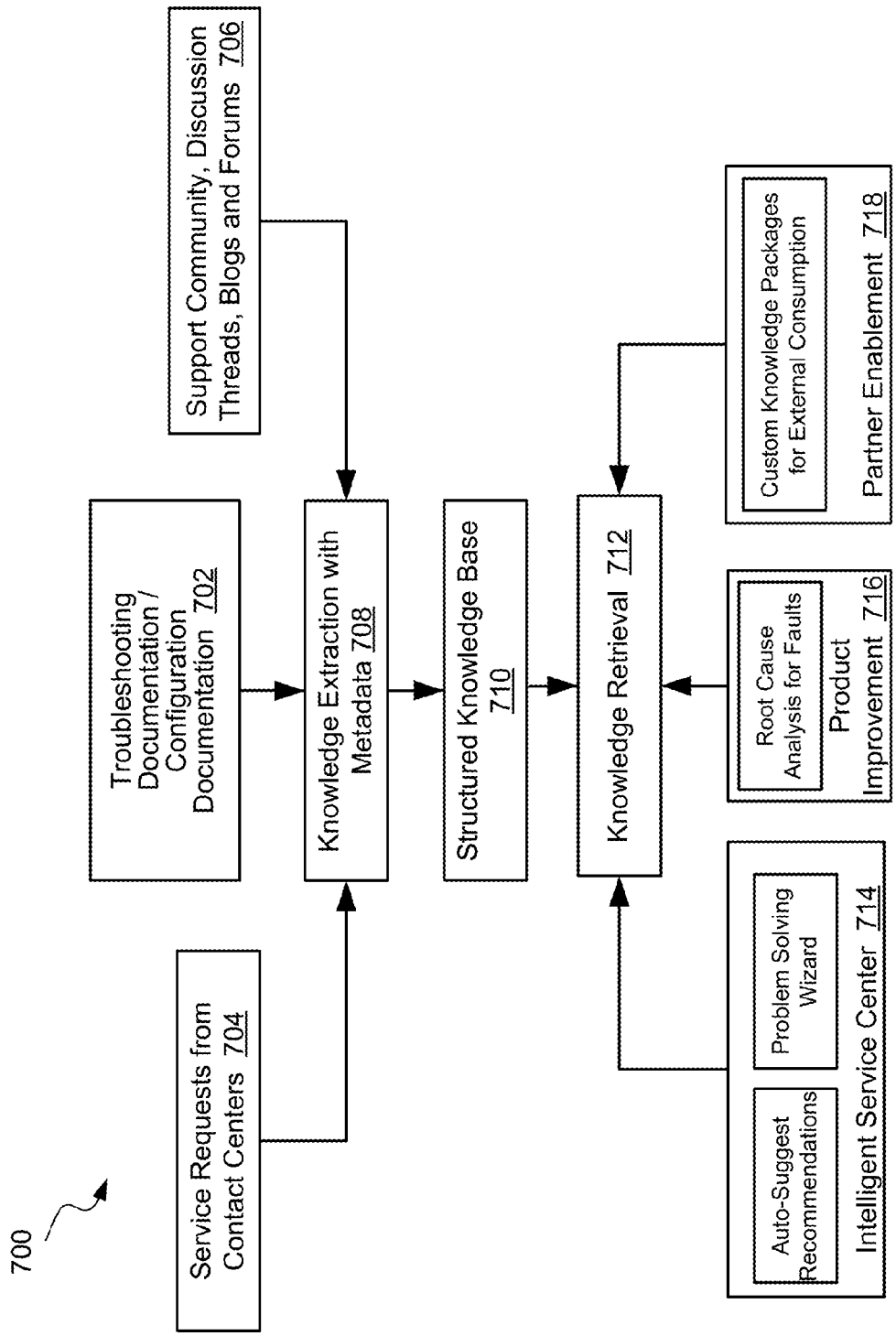
FIG. 7 illustrates an example of knowledge extraction and reuse process flow implemented for a support service center, in accordance with some embodiments.

FIG. 7 depicts an example of a knowledge extraction and reuse implemented in a support service center, in accordance with some embodiments. This center may include repositories of knowledge-bearing unstructured data (e.g., text based documents or simply text) that is frequently used in the support environment. To provide some context, the primary role of representatives in the support service center may be to answer questions and solve problems presented by customers. To perform this role, representatives may be required to possess subject matter expertise in the field in which problems are set and often be able to interpret the information available from other sources, i.e., for those questions and issues not encountered in their own experience. As often the case, the details of the requested service (from the time the problem was reported and until the problem is resolved) may be presented as an unstructured text in some source. Such text may be laden with technology terms and acronyms and subject to informal writing and typographic errors. The size of this text may range from a few pages to a hundred pages or more depending on the complexity of the issue. With a constant inflow of new questions, the representatives may continue to update their knowledge by solving problems. With thousands of such requests to answer questions and/or solve problems being processed on a daily basis by hundreds of support service engineers, the efficiency of extracting knowledge may be significantly improved if machines could be deployed to automate or semi-automate this process in a human-machine combination to achieve a dual goal of both scalability and quality. Such extracted knowledge may need to be represented in a specific form as to aid retrieval and reuse by the machine. An automated infrastructure may be required to achieve knowledge extraction and reuse that scales well. Crowd-sourced machine-learning may be used to solve a problem where the human expert and the machine based learning and analytics have complementary and overlapping strengths and synergies.

Specifically, FIG. 7 illustrates a knowledge extraction and reuse process flow 700. The process flow 700 may commence with collecting data by or pushing data to Knowledge Extraction with Metadata module 708. Some examples of data sources include Troubleshooting Documentation/Configuration Documentation 702, Structured Knowledge Base Support Community, Discussion Threads, Blogs and Forums 706 and Service Requests from Contact Centers 704. Knowledge Extraction with Metadata module 708 may processes this data to generate Structured Knowledge Base 710. Knowledge Retrieval module 712 may be accessed by Intelligent Service Center 714, Product Improvement Center 716, and Partner Center 718 (e.g., for partner enablement purposes) for various purposes, such as providing auto-suggested recommendations, providing problem solving wizard, performing root cause analysis for faults, and generating custom knowledge packages for external consumption.

Some aspects of provided methods and systems may include a modular design capable of accepting disparate input sources, some or all of which contain knowledge. The methods and systems may utilize a representation of the domain and product knowledge of the technology developed or adopted by the enterprise to assist in the process of knowledge extraction, storage, and retrieval. The methods and systems may need to be able to separate relevant portions of data from irrelevant ones and able to operate across the different knowledge sources. In a specific application, the relevance may be defined as a specific meaning of troubleshooting process of answering the customer question or problem. In some embodiments, the proposed methods and systems may be applied to relevant sections of text to extract granular and classified knowledge. The knowledge may be granular enough given the nature of the specific unstructured text. For example, the extracted knowledge may have high precision and classified with high accuracy based on an underlying business process. Knowledge with further granularity and classification requirement may need to be extracted by a human from the results provided by a machine to provide an optimized human-machine combination according to various embodiments. The methods and systems may need to be able to automatically determine the keywords describing each component of the knowledge, namely, the problem, a high level cause and solution, and attach the keywords to the knowledge. More broadly, the machine needs to learn a (possibly sequential, social, graph, tensor) pattern latent in the data segment based on human expert guidance, and work to determine a higher level (business and/or other) process (including web), while exploiting the effective state space. The knowledge retrieval and reuse to assist solving the current problem may need to use the keywords and the associated relevant textual excerpt from the original knowledge source.

A retrieval engine, a decision engine, or a recommender engine for knowledge retrieval may have a role beyond reusing the knowledge to solve other similar problems within the support service center. An engine that extracts a trend associated with hardware and software failure modes may assist the product development team in performing a root cause analysis and facilitate improvement in the product quality. Besides being uses internally within an organization, the knowledge may be valuable to customers interested in a knowledge base of potential causes and solutions to problems within a given set of technologies that is pertinent to their environment. A retrieval engine may assist the knowledge provider in monetizing the knowledge when retrieved and packaged in a tailor-made customer bundle. The value and desirability of the retrieval engine may be a result of the dynamic nature of the knowledge that the provider will offer to the customer through periodic knowledge updates based on the learning performed since the last release. Optionally, the knowledge extraction may be performed real time in memory.

One example of the service system is described herein. A corresponding text analytics system is also described to address the knowledge extraction and reuse of service requests for support services by using human resources and software analytics in optimizing the service delivery process. In some embodiments, the service request analyzer, as the bottom layer foundation, may be provided to handle complex service requests and to present categorized and pertinent information to service representatives. These operations may be completed based on the service request recommender and an upper layer application may be built to retrieve similarly solved service requests, when presented with a new similar request. The categorization applies broadly to all types of data, and is not limited to text alone. For example, in a data usage context, a younger social group may play more games with rapidly changing data inputs, versus older social groups viewing educational text and videos in a slower and more deliberate manner. Categories can be generated for this context, having business context and value, based on this (web business) process, with the intent of category based actions and monetization, wherein the fee structure may vary depending on the pattern and associated category or process of usage. A design of the illustrative text analysis and system may include identifying elements of the diagnostic process underlying the creation of service requests, and designing a hierarchical or other classifier to decompose the complex service requests into those elements. Various embodiments of the systems and methods provide strong extensibility features to support upper layer applications such as information retrieval by providing classified knowledge. The system may include a service request recommender built on top of a service request analyzer to extend the system functionality for improved knowledge reuse. In some embodiments, the methods based on language models may be provided to measure service request similarity for more accurate recommendation of service requests.

Embodiments of the systems and methods may be utilized for network services and knowledge extraction from service requests, and may also be extended into many new domains, including but not limited to semiconductor manufacturing, aerospace system operation, automotive system design, network design diagnostics, health care, web analytics, ecommerce, ebusiness, and financial services. In addition, in some embodiments, the system and method may be configurable for use for other business functions within the enterprise.

Examples of Knowledge Extraction Features

Initially, challenges and requirements in automating knowledge extraction from unstructured text may be addressed. Knowledge extraction and reuse may be difficult due to many challenges with automating of the functions of a machine, as described above with reference to the process, and also due to diverse needs associated with upper layer applications. Illustrative systems and methods that address these challenges and requirements are also described below in more detail.

Unlike the structured information from operational applications and transaction systems, unstructured text may provide situational context around an event or set of events that aid answering the questions like "what was the problem?", "why did it occur?", and "how was it solved?" by essentially filling in the details of the "problem, cause, and correction" knowledge cycle. In an illustrative service center scenario, the major content of the textual support sources may be unstructured text from which the support engineers may have to find the "what," "why," and "how" to uncover hidden relationships, evaluate events, discover unforeseen patterns, and facilitate problem identification for rapid resolution. However, the most important facts or concepts are not always readily available, but may be veiled in the myriad of details and noise that accompany them. Extracting knowledge from the unstructured text is a daunting task for the service center engineers. Simply transplanting data mining algorithms may not provide satisfactory results for a number of reasons described further herein.

Because some types of the support sources may record the textual information about the interaction between a customer and support engineers, the sources may contain substantial duplicates and near-duplicates originating from the quotation of previous messages, the repetition of email signatures (name, title, telephone number, addresses, and so on), and system notes. Such substantial duplicates and near-duplicates may account for a large portion of the unstructured text, nearly all of which is useless and even of negative value for tracking and assessing similarity between service requests.

Even after the duplicates are removed, there may still be a significant amount of remaining text that the engineers will have no use for, such as the email header (sender address, recipient address, subject, date, and so on), email signature, system notes, greeting and closing sentences, and self-introduction, as well as paragraphs such as "If you need any assistance, please . . . " If this text were not removed, a system may erroneously treat it as a part of the text that has knowledge. Detecting and removing the irrelevant text reduces the documents created by support sources to only that text where the knowledge is located. However, this is not a simple task, because not all of this irrelevant text has obvious patterns to identify.

From the perspective of ontology, the knowledge embedded in support sources for this service center example is typically composed of many categories of information corresponding to "what," "why," and "how." Engineers might pick different parts for use according to their needs in different situations. For example, some engineers might be interested in just the "what" and the "how," while others might be interested in the "why" as well. These diverse demands are one of the reasons for looking at the diagnostic business process inherent in support documents. Granular knowledge can help respond to or accommodate diverse needs in practice.

Systems for text categorization may use learning algorithms in conjunction with the bag-of-words features. The bag-of-words approach is inherently limited, however, as it can only use pieces of information such as words that are explicitly mentioned in the documents. Specifically, this approach has no access to vital domain knowledge. Consequently, the conventional data mining system would be unable to function effectively when required to respond to the facts and terms not mentioned in the training set. Hence, various embodiments of the systems and method of the present invention may capture features from (1) bag of words; (2) domain knowledge, by using technical documents describing the terms and acronyms being referred to in service requests in generating semantic equivalents; and (3) expertise, by using features suggested by the experts for each component of the diagnostic business process.

A machine learning algorithm might fail in text mining for the following reasons. (1) Acronyms and abbreviations are widely used in domain-specific documents such as service requests. Since an acronym is at best defined when it first occurs, a machine learning algorithm might fail to associate the concept with its acronym in subsequent processing, because of the lack of domain knowledge, unless this is retained in memory. (2) Lack of a semantic processor, which includes a terminology dictionary or thesaurus. This lack results in the inability of the system to identify semantically equivalent words and associated concept dependencies. In other words, the relationship between problem and the underlying cause, the connection among problem components, and the relationship of different problems, may all be left undetected.

A similar problem may apply to terminology. Without domain knowledge and semantic understanding, the technical terms are typically treated as independent symbols by the machine, undifferentiated from other common words. In a sense, the mining, without domain knowledge and semantic understanding, functions only at the word level, which is the surface layer of text, instead of discovering hidden dependencies among concepts.

Thus, the linguistic, or, more specifically, structural features, which are semantically useful in the business context, may need to be identified to categorize knowledge, along with the concept dependency embedded in support documents. To address the above issues of incorporating indispensable domain knowledge, a terms and acronyms dictionary may be used in some embodiments to incorporate specific domain knowledge. The dictionary may not only expands the acronym, but also provide a description of the acronym or term, which may help the data mining algorithm in understanding of its semantic meaning, function and related concepts.

For an illustrative service center application, a services engineer may need to read several documents to determine possible solutions to the current problem and to create the refined knowledge repository. Thus, these documents should address the same or similar problems but may have different troubleshooting steps and solutions. Having the engineer read the documents in the order provided by a search engine may be suboptimal since even highly ranked documents are not necessarily guaranteed to satisfy their needs. The reason is that typical search engines match terms and frequencies in the query and the storage documents in a specific manner, without necessarily considering the knowledge processes of interest to the user. It would be more helpful to the service engineer if the search engine recommended documents that are highly similar to the current problem in the problem description but with different steps in the troubleshooting and the solution steps. However, a typical search engine matches the search query with the text in a document without the due discrimination and is consequentially ineffective. Various embodiments of the disclosure provide a document recommender to address this requirement by matching based on more granulated and segmented text.

By characterizing every document across all support sources with appropriate keywords, engineers may quickly grasp the core issue, environment, and solution from the document before deciding to read through it or to skip it altogether. Keywords may serve as a dense summary for a document, and have the potential to help document retrieval, clustering, summarization and so on. However, those automatic keywords extraction methods based on term occurrence, such as tf-idf and BM25 weighting (which are search engine approaches), do not work well on documents from support sources because the complexity of the problem itself, the domain knowledge and the concept dependencies complicate the process of keywords selection considerably. In this context, more sophisticated algorithms are needed that may incorporate, depending on the level of sophistication required, one, some or all of the following: term statistics, Natural Language Processing (NLP), patterns, contextual features, domain knowledge, and expertise in a supervised manner for keywords extraction from domain-specific documents; embodiments may not necessarily include all of these.

Community-based Question Answering (QA) services may provide a platform for customers to exchange knowledge and solve problems in the form of questions and answers, before the customers reach out to a service center engineer for help. Typically, there are thousands of questions asked each day, but some portion of them may not be answered or there may be a lag between the time when a question is asked and when it is answered. To ensure more questions are correctly answered or expedite the QA interaction, it is important to deliver the right answer to the right user. Usually in communities, there is a small number of highly active users who contribute a large number of technically correct, complete and reliable answers to the questions in the domains they are expert at. Identifying these experts based on their expertise and forwarding appropriate questions to them during their activity can lead to quick support and improved user experience.

In such online support communities, there is a portion of "old" questions which may have documented solutions but may still be repeatedly asked by other users. If such a question, when asked, can be mapped to those answered questions, the existing answers may be readily available to the users. Hence, in some embodiments, the system and method may provide matching new question to the already answered question based on domain and semantic similarity.

Service Center Application Features

Some embodiments of the systems and methods for supporting services in a service center will be now described. Modern day service centers are building blocks for highly efficient and productive business systems in a knowledge economy. In these service systems, accurate and timely delivery of pertinent information to service representatives is the cornerstone of providing efficient customer service. There are two main steps in achieving this objective. The first step concerns efficient text mining to extract critical and pertinent information from the very long service request documents in the historical database. The second step involves matching new service requests with previously stored service requests. Greater efficiency can be achieved by minimizing time spent by service personnel in extracting the Knowledge Nugget (KN) or Knowledge Process (KP) and providing knowledge services which have economic value. An illustrative system is described herein that provides a text analytics system, e.g., a Service Request Analyzer and Recommender (SRAR), designed to improve the productivity in an enterprise service center for computer network diagnostics and support. The SRAR may unify a pre-processor, a classifier, and a recommender, to deliver critical, pertinent, and categorized knowledge for improved service efficiency. Only some of the three elements may be provided in some embodiments.

In some embodiments, the systems and methods identify components of the diagnostic process underlying creation of the original text documents. This identification may help with successful design and prototyping of the SRAR and its hierarchical classifier element. The use of domain knowledge and human expertise to generate features may provide synergistic elements in improving the accuracy of the text analysis toward identifying the components of the diagnostic process. The evaluation and comparison of the SRAR with previous approaches demonstrate the effectiveness of the sample system and method as described further below. The system and method described herein may be generalized for many service industries and business (web and other services) functions that mine textual data to achieve increased efficiency in their service delivery. Significant service time responsiveness improvements were observed experimentally during the first step of KN or KP extraction in network service center context during the case study as described further below.

The pre-processing steps may include duplicates or near duplicates, irrelevant information, diverse needs and demands, incorporating features and domain effectively, learning from multiple data segments, experts, forums, social (media and network) structures, reuse, and particularly the extraction based on a business and/or other process (including web). One aspect is to identify elements of a data process which are most interesting from a user or business perspective, both to estimate certain important elements and optimize some desired objectives. This focus permits the elimination of much of the data which is irrelevant, which may degrade the estimation (extraction) and optimization (decision/recommendation) aspects. It may also permit categorization of essential data, so that this compressed and highly relevant extracted knowledge is highly relevant, and permits decisions and recommendations with reduced uncertainty and risk and increased value and probability of success.

Enterprises today generate and collect a significant amount of data in the ongoing process of doing business. The generation of operational data, such as that produced in customer relationship management (CRM), click-through, query logs, and transactions, has resulted in an explosion of information. It is widely understood that such data represents a significant advantage in terms of its potential to be mined so as to provide business insight and guidance. More and more enterprises tend to build business by extracting knowledge and insights from their data. However, there are various difficulties associated with this process, such as extracting knowledge from noisy data, factoring in the business process, and addressing diverse user needs.

In the service center of a company supporting a multitude of products and technologies, customer support engineers may have the task of providing assistance to customers to address their questions and solve their problems. When a customer calls into the service center with a question or an issue, a service request may be created in the database to record the information associated with the customer, the statement of the question or problem, and any other supporting documentation. In a large-scale service environment, thousands of such service requests are created or updated on a daily basis. Once the service request is assigned to an engineer, all communication, tests, and test results produced from the opening to the closure of the request may be recorded against the service request. Most of this information may be recorded as unstructured text as the content consists of internal or external email correspondence, a written description of a phone conversation, or the text output to a command from a device. Some service requests may be simple with the length of a few pages, and some may be more complex where the length reaches a hundred of pages or more. The service request in its completed form after the closure may have duplicate text arising from email correspondences that contain repetitive threads sent back and forth, a form of writing that is not edited for grammatical accuracy and has no restrictions on syntax or typographic errors, verbiage that is acronym and abbreviation intensive, text outputs from commands issued to devices that do not conform to standard writing, along with miscellaneous text such as internal notes and other correspondences. Within this large volume of text is the KN or KP that describes the true problem, together with the troubleshooting steps taken to narrow it down to its true cause and the action plan that was used to resolve it. Such refined information, when extracted can be classified as knowledge and may serve as a foundation for the provided methods and systems.

Platform Architecture Examples

Figure 8:
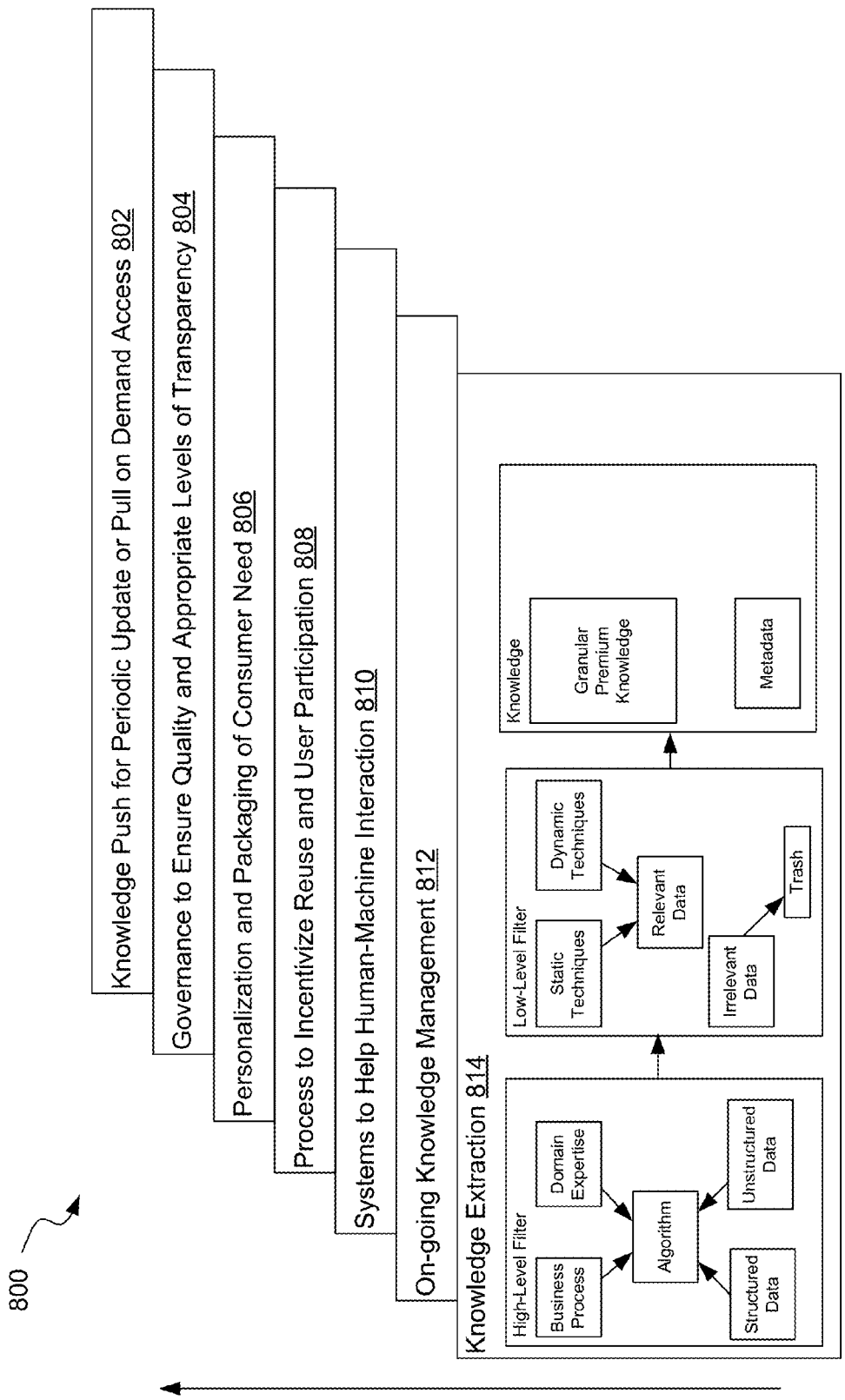
FIG. 8 depicts an example of a service platform used for execution of knowledge extraction methods, in accordance with some embodiments.

FIG. 8 illustrates an example service platform 800, in accordance with some embodiments. Service platform 800 may include Knowledge Push for Periodic Update or Pull on Demand Access module 802, Governance to Ensure Quality and Appropriate Levels of Transparency module 804, Personalization and Packaging of Consumer Need module 806, Process to Incentivize Reuse and User Participation module 808, Systems to Help Human-Machine Interaction module 810, On-going Knowledge Management module 812 and Knowledge Extraction Engine module 814. In some embodiments, Knowledge Extraction Engine module 814 may include a high level filter, a low level filer, and a knowledge sub-module. The high level filter may include an algorithm for analyzing business processes, domain expertise, structured data, and unstructured data. The low level filter may produce output containing irrelevant data and relevant data. The irrelevant data may be deleted. The relevant data may be retrieved using a static technique and a dynamic technique. Finally, the knowledge sub-module may collect the granular premium data and metadata.

Figure 9:
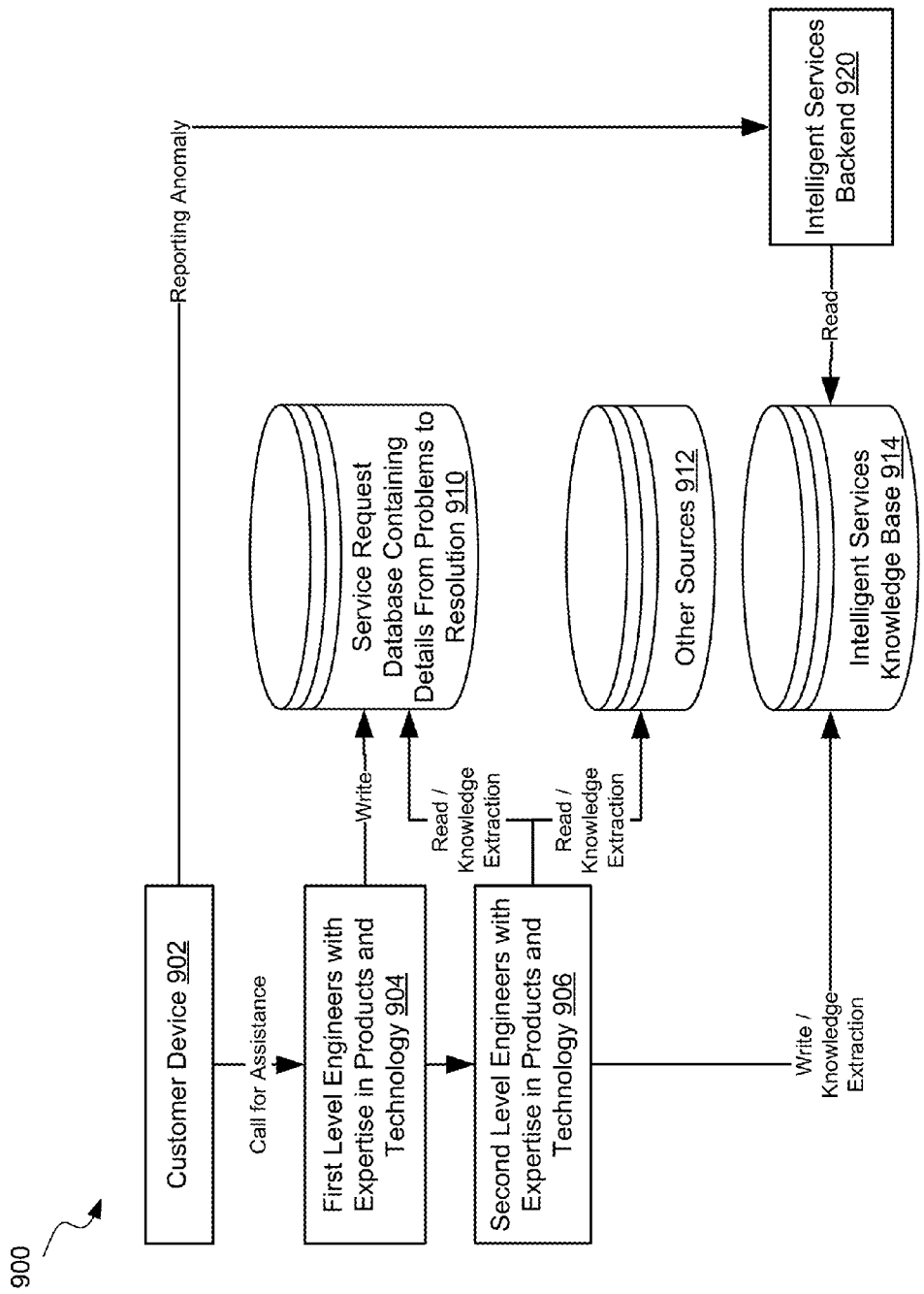
FIG. 9 depicts an illustrative block diagram representing various phases in a knowledge extraction and delivery process implemented in a knowledge extractor system, in accordance with some embodiments.

FIG. 9 illustrates an example of a block diagram that includes various phases in the knowledge extraction and delivery process used in the KN or KP and associated example knowledge sources, extraction, and application, in accordance with some embodiments. A customer device 902, when enabled for the KN or KP, may be configured to send messages to a back-end system 920 to report the anomalies detected within device 902. The messages sent may be machine representations of a customer reporting the same problem to first level engineers 904. First level engineers 904 include persons who typically interact directly with customers and may be distinguished from second level engineers 906, who provide back end support. First level engineers 904 are sometimes referred to as customer service engineers (CSE), while second level engineers 906 are sometimes referred to as intelligent services engineers (ISE). For established products, many reported problems may be solved by first level engineers 904 in the call center without involving second level engineers 906.

In the presented example, second level engineers 906 have a role of creating a knowledge base 914 of a refined KN or KP, mapping messages from devices 902 to recommendations that can potentially solve the problems, and perform other functions. To create such knowledge base 914, second level engineers 906 may attempt to retrieve relevant service requests from service request database 910 to determine if these service requests already have a proven solution that can be used to create such refined knowledge data for storing in knowledge base 914 (identified as "Intelligent Services knowledge base" 914 in this example to distinguish it from other databases). Second level engineers 906 may also consult a number of other sources of the KN or KP, such as internal and external documentation in this process. The information collected in the intelligent service knowledge base 914 may subsequently be used by the back-end systems to provide a set of recommendations when an incoming message from customer device 902 reports an anomaly.

In some embodiments, second level engineers 906 may need to process many details provided in service requests (available from service request database 910) to extract the knowledge. However, manual extraction of the KN or KP is time-consuming and difficult work for second level engineers 906, because the KN or KP being sought is very likely to be hidden in the midst of massive amount of text of the service requests. These stored service requests may contain relevant, irrelevant, and duplicate information. Hence, automation or semi-automation of KN or KP extraction process by data mining techniques provides an effective way to improve the productivity of engineers 904 and 906.

Although some data mining tools can automatically search for patterns and discover correlations based on certain techniques and metrics, transforming data for analysis and interpreting the results as actionable intelligence may require expertise and domain knowledge. For example, in text clustering analysis, tools could present the word clusters from a technical report, but it may be difficult to specify which cluster is the most pertinent to the theme of the report and which words can be used as keywords, due to the lack of contextual understanding. Thus, the role of domain knowledge and human expertise may be important in this process. Automating this combined information extraction process that captures expertise may present significant challenges.

A clear understanding of this business process aspect may be essential in designing a system to help choosing correct tools and techniques that may provide optimal results. Various embodiments described herein address this business process aspect by providing business analytic modules that go beyond data mining by combining domain knowledge, understanding that part of the text which corresponds to certain elements of the diagnostic business process, and addressing diverse user needs. At the end of the process may present useful data, text patterns and structures to the expert in a manner that expedites understanding and helps interpretation.

Various embodiments of a service center example include the SRAR for automation, which may be used for improving productivity of a service center. Text analysis may be quite complex and various related documents may involve: (1) hypothesizing and validating the presence of a diagnostic business process that is inherent in a service request; (2) extracting four components of this business process using a hierarchical classification or other schemes with features generated from documented domain knowledge and human expertise; (3) utilizing an efficient service request recommender based on language models (LMs) or other models, the components of the diagnostic business process, and domain knowledge; and (4) utilizing experience and the lessons learned in developing and deploying the illustrative system.

A structured ontology which may be hypothesized and validated is provided based on the knowledge diagnostic process, to enable effective information extraction. Based on this structured ontology, elements for various embodiments have been developed including appropriate algorithms or considered the factors that influence system performance, and introduced domain knowledge and expertise capture. Experimental results have confirmed that the hypothesis indeed discovers the latent structure from the heterogeneous text.

The systems and methods provided herein may be applicable to network services and knowledge extraction from service requests and further generalized into many other domains including, but not limited to semiconductor manufacturing, aerospace system operation, automotive system design, network design diagnostics, healthcare and financial services for instance.

Case-Based Reasoning (CBR) Examples

The CBR is a problem solving paradigm that aims to solve a new problem by remembering a previous similar situation and by reusing related information and knowledge of that situation. A general CBR cycle may include four processes: retrieval of the most similar case, reuse of the information in that case to solve the problem, revision of the proposed solution, and retaining of this experience for future problem solving. The processes of retrieval and reuse may have some similarities between the CBR and the SRAR, though they may differ in several aspects and details as described further below.

The retrieval process may be based on a question-answering system. Conceptually, each of the question-answer pairs is treated as a problem and solution in a CBR framework. Given a typed question as an input, it can retrieve textual answers. This approach uses techniques that combine statistical and semantic knowledge to measure similarity. In addition to the vector space retrieval model, it may include a semantic definition of similarity between words. Another question-answering approach compares textual cases through the meanings of terms. This process identifies information entities, i.e., keywords. Domain knowledge may be required to identify such task-specific keywords. The similarity assessment evaluates keywords similarity using manually constructed domain ontology as well as a generic thesaurus. Another approach may perform CBR analysis of the input problem on a small, manually prepared case corpus. The important cases in the results of this analysis are selected by the user and then are used as queries in the text-based KN or KP system to retrieve results from a large, unprepared corpus with greater precision.

The reuse process may involve methods to map textually expressed cases into structured representations. For example, a semi-automated approach to populate case templates from documents may be used. The method may be domain-specific and require knowledge engineering from domain experts as one way to identify the templates, and the variations in which they might occur in the domain-specific texts. This knowledge may be used to feed template mining methods that extract the feature values from text to characterize the cases. The CBR may be applicable within a service center environment and some elements of the CBR may be combined with the SRAR, because it does not explicitly address issues addressed by the SRAR.

Although the CBR and the SRAR have some commonality, they may differ in several aspects and details, which are summarized in Table 2.

TABLE 2

Comparison between sample CBR and SRAR systems

| | CBR | SRAR |
|---|---|---|
| Objective | To solve a new problem by reusing and revising information and knowledge of a similar previous case. | To assist service center engineers is solving a new problem by extracting and categorizing the KN from a similar previous case. |
| Case base | Well represented, structured data with few duplicates and irrelevant content. | Raw, unstructured, long, complex text with many duplicates and much irrelevant content. |
| Retrieval | Vector space model; syntactical similarity; similarity of features; domain knowledge; generic thesaurus. | Language models-based similarity + domain knowledge. |
| Reuse | Specific reuse: classify which part of a retrieved case can be transferred to the new case and which part needs adaptation; finally provide a new solution. | Contextual reuse: extract the KN from a retrieved case; categorize the KN according to the business process; provide service center engineers with categorized KN to meet different needs and demands. |

Unstructured Text and Business Process Structure Examples

Unlike the structured information from operational applications and transaction systems, unstructured text provides situational context around an event or set of events that aids answering the questions "what was the problem?", "why did it occur?", and "how was it solved?" essentially filling in the details of the "problem, cause, and correction" KN or KP cycle. For the service center examples described herein, the majority of the service requests content is unstructured text from which the engineers have to find the "what", "why", and "how" to uncover hidden relationships, evaluate events, discover unforeseen patterns, and facilitate problem identification for rapid resolution. However, the most important facts or concepts are not always readily available, but may be veiled in a multitude of details and noise that accompany them. Extracting KN or KP from the unstructured text may be a daunting task. Simply transplanting data mining and CBR algorithms may not provide satisfactory results.

Duplicates and Near-Duplicates Examples

Because a service request includes textual information about the interaction between a customer and an engineer, it may include substantial duplicates and near-duplicates originating from the quotation of previous messages, the repetition of email signatures (name, title, telephone number, addresses, and so on), and system notes. Nearly all of these duplicates may be useless and even of negative value for tracking and assessing similarity between service requests. The systems and methods provided herein help to remove these duplicates to enhance the value of KN or KP.

Irrelevant Information Examples

Even after the duplicates are removed, there may still remain a significant amount of text that engineers do not need, such as the email header (sender address, recipient address, subject, date, and so on), email signature, system notes, greeting and closing sentences, and self-introduction, as well as paragraphs such as "If you need any assistance, please . . . " These pieces of content are irrelevant, but may take up a substantial part of a service request on average for the case study. If this text were not removed, the existing enterprise system will treat it as part of the text that has information. Detecting and removing the irrelevant text is a functionality of the described methods and systems. It reduces the amount of data stored in the service request to only that text where the KN or KP is located.

Diverse Needs and Demands Examples

The KN or KP embedded in service requests may be composed of many categories of information corresponding to "what", "why", and "how" questions presented. Engineers might pick different parts for use according to their needs in different situations. For example, some might be interested in just the "what" and the "how", while others might be interested in the "why" as well. These diverse demands may be addressed by features of the described methods and systems that look at the diagnostic business process inherent in service requests. As such, a granular KN or KP can help respond to or accommodate diverse needs.

Feature Generation Examples

While text categorization may be used in conjunction with the bag-of-words features, there are certain limitations in these approaches. For example, the bag-of-words approach can only use pieces of information such as words that are explicitly mentioned in the documents. Specifically, this approach may have no access to vital domain knowledge. Consequently, the data mining system may be unable to function effectively when required to respond to the facts and terms not mentioned in the training set. The described systems and methods may address these deficiencies by capturing features from bag of words and domain knowledge. Furthermore, these described systems and methods may use technical documents describing the terms and acronyms being referred to in service requests in generating semantic equivalents. Finally, the expertise functionality may be added and allows using features suggested by the experts for each component of the diagnostic business process.

Domain Knowledge Examples

A machine learning algorithm might fail in text mining for various reasons including acronyms and abbreviations widely used in domain-specific documents such as service requests. Since an acronym is at best defined when it first occurs, a machine learning algorithm might fail to associate the concept with its acronym in subsequent processing, because of the lack of domain knowledge, unless this is retained in memory. Another reason a machine learning algorithm might fail is a lack of a semantic processor, which includes a terminology dictionary or thesaurus. This may result in the inability of the system to identify semantically equivalent words and associated concept dependencies. In other words, the relationship between problem and the underlying cause, the connection among problem components, and the relationship between different problems, may remain undetected.

In addition, without domain knowledge and semantic understanding, technical terms may be treated as independent symbols by the machine, undifferentiated from other common words. In this sense, mining functions may be present only at the word level, which is the surface layer of service requests, instead of discovering hidden dependencies among concepts.

Thus, in the service center context, linguistic or, more specifically, structural features, which are semantically useful in related business operation of the service center, may be identified. Furthermore, an Internetworking Terms and Acronyms Dictionary (ITAD) may be used to incorporate networking domain knowledge. ITAD may be used for expanding the acronym and providing descriptions of the acronym or term, which helps the illustrative data mining algorithm to understand its semantic meaning, function, and related concepts. For example, the ITAD may not only identify "ARP" as "Address Resolution Protocol" but it may also define it as "internet protocol used to map an IP address to a MAC address" and provide the following context "Defined in RFC 826. Compare with the RARP. See also proxy ARP."

Examples of Learning from Multiple Service Requests

To create the refined KN or KP repository, a service center engineer may need to read several service requests to determine possible solutions to the current problem. Thus, these service requests may address the same or similar problems but have different troubleshooting steps and solutions. It might be suboptimal to get the engineer to read the service requests in the order provided by the search engine. Even highly ranked service requests are not necessarily guaranteed to provide correct information. A reason for this is that the engineer may wish the search engine to recommend service requests that are highly similar to the current problem in the problem description but with different steps in the troubleshooting and the solution steps. However, a typical search engine may match the search query with the text in a service request without the required discrimination and is consequentially ineffective. A service request recommender may be used for matching based on more granulated and segmented text.

System Architecture Examples

Figure 10:
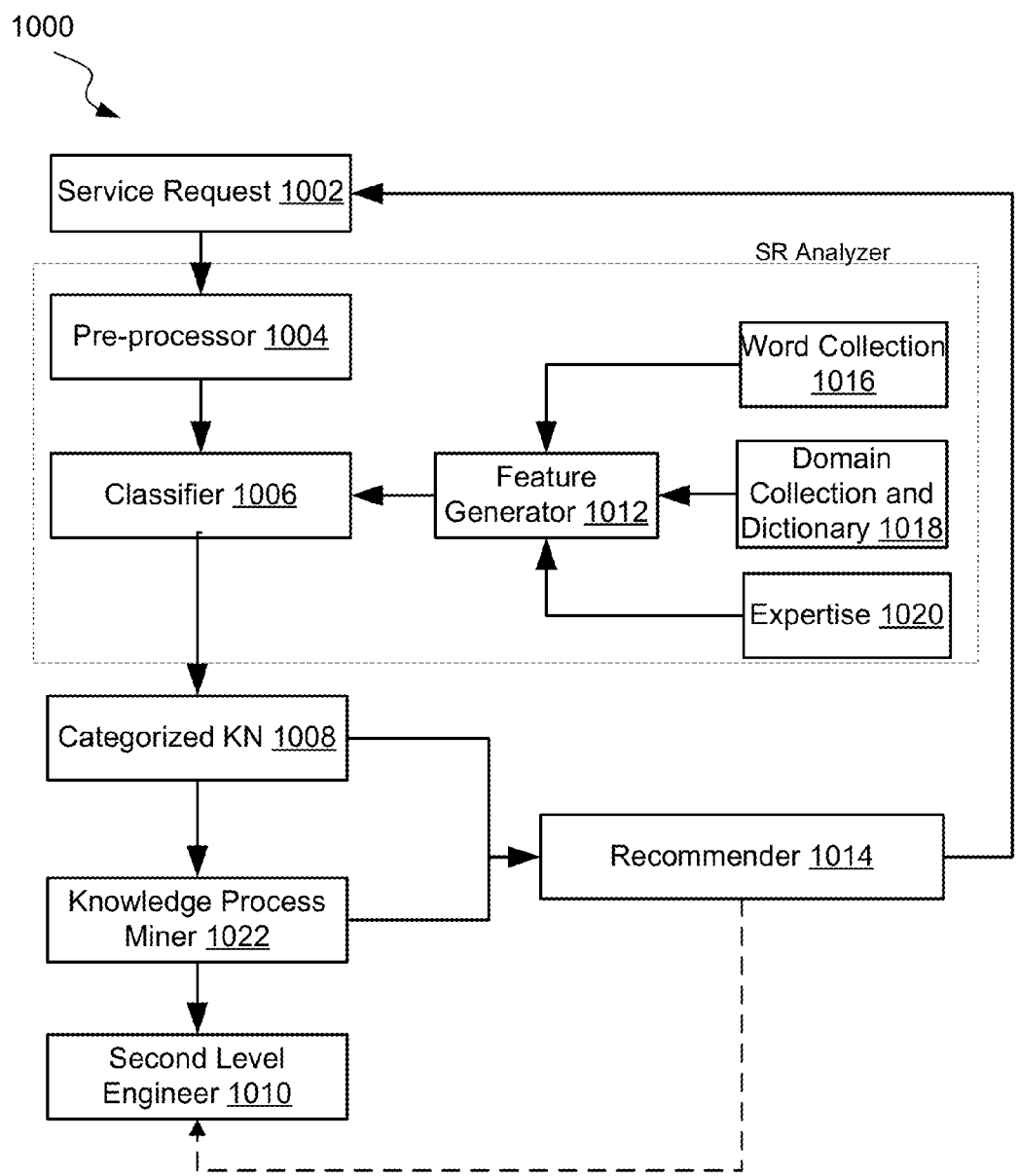
FIG. 10 is a schematic illustration of the Knowledge Process Extractor and Decision/Recommender Engine (KPE-DRE) including a Service Request Analyzer and Recommender (SRAR), in accordance with some embodiments.

FIG. 10 is a schematic illustration of a SRAR architecture 1000 and information flow within the system, in accordance with some embodiments. The SRAR system may be designed to provide various features described above and to improve the overall work efficiency. The design may be based on the identification of the diagnostic business process inherent in service requests. The service request 1002 may contain both the structured and unstructured content that may be retrieved in XML format from the database. The unstructured text containing the KN or KP may be extracted from the XML file using the pre-processor 1004. The processed text may then be inputted into the classifier 1006, which may remove the irrelevant information and extract the relevant information (e.g., during the first pass). The classifier 1006 may be a hierarchical classifier. The classifier 1006 may also categorize the paragraphs by labels in accordance with the type of content in that paragraph (e.g., during the second pass or simultaneously in the first pass). The features may be enriched with domain knowledge and human expertise to achieve high classification accuracy (e.g., by an engineer or the system). To expand the bag-of-words method, the ITAD may be incorporated to use domain knowledge and also combined human expertise to incorporate the insights of the engineers. A feature generator 1012 may be provided as described in more detail below. A recommender 1014 may be provided for situations in which the engineers 1010 are not satisfied with the KN or KP extracted from a single SR alone, in which case the recommender 1014 can suggest other service requests with a similar context. The recommender 1014 may be an LM based SR recommender, decision engine, search engine, etc.

When a service request 1002 is retrieved in XML format, the system 1000 may return the entire service request, in which the content is described through tag types. Structured data may have unique tag types. However, unstructured text detailing the correspondence between the customer and the engineer that includes relevant, irrelevant, and duplicates, is returned together with the same tag type. The process may involve sifting through the content and extracting only that content which has the KN or KP. At the first step, the pre-processor 1004 may be used to handle XML files, extract the unstructured text, separate text into paragraphs, and remove duplicates.

Two approaches for de-duplication may be implemented. First, a hash algorithm can be used to detect identical contents. However, any change in formatting, word order, or slight variations in content may produce a different value. For example, almost identical content with a few characters added or removed between two pieces of text may also constitute a duplicate for humans. This near-duplicate may also be part of the content in an SR. For example, most near-duplicates in the email quotation are not identical to the original text; line duplication indicated by the email reply symbol ">" is a good example. The hash method may be unable to detect such duplicates. Another approach includes resemblance measurement that detects fuzzy similarity between two documents. If a threshold is exceeded, the documents are considered duplicate.

The SRAR system 1000 may be used to present the desired KN or KP in a compact, easy-to-understand fashion to facilitate the work of an engineer 1010. After de-duplication, the KN or KP may still not be evident as it is hidden in a massive amount of heterogeneous irrelevant information. This irrelevant information cannot be reduced as easily and accurately as using the de-duplication as it lacks universal patterns. What is more, even if the irrelevant information could be removed completely, the KN or KP may still be not easy for engineers 1010 to digest and absorb. In some embodiments, the KN or KP may be granulated into several functional categories that are aligned with the diagnostic business process. This feature could assist engineers 1010 with obtaining the information they need more effectively and rapidly. To handle the heterogeneous contents of service requests and the diverse needs of engineers, a supervised learning algorithm is provided in some embodiments to analyze the KN or KP and to propose a hierarchical classifier to improve prediction accuracy. Optionally, a Knowledge Process Miner 1022 using KN or KP including patterns may be used to further refine the KN or KP for the engineers 1010. In another embodiment, the Knowledge Process Miner 1022 may be incorporated with the Categorized KN 1008.

The diagnostic business process structure may be exploited to achieve effective information extraction. In some embodiments, classifier 1006 may be used. Other approaches are possible as well. Classes, which are meaningful for the task and result in enhanced performance, may be identified using the diagnostic business process structure.

Utilizing a hierarchical structure allows decomposing the classification problem into a set of smaller problems and reducing the overall noise associated with irrelevant data and redundancies. The classifier may first learn to distinguish between relevant and irrelevant paragraphs at the top level. Then lower-level KN or KP distinctions are learned within the relevant paragraphs. In some embodiments, four KN or KP categories may be defined in terms of engineers' needs, e.g., problem description, troubleshooting, inference, and action plan. Each of these subclasses can be classified more efficiently and more accurately.

Classifier 1006 may be configured to resist the class bias problem. For highly skewed data, the class distribution may be biased toward the majority in the sense that a general classifier would lean to predict the major class in order to obtain a higher overall accuracy. On the other hand, flat classifiers tend to misclassify most KNs or KPs, which is counter to the objective of predicting the minor classes to achieve a low false negative rate while maintaining overall accuracy. Utilizing a hierarchical classifier may address these deficiencies.

Feature Generator Examples

Feature generator 1012 may be used for text categorization. As stated above, the conventional bag-of-words approach is deficient because of its limited representation of the information in sentences. Feature generator 1012 uses domain-specific ITAD to enrich the bag of words with new allowing more informative outputs.

Besides expanding acronyms, ITAD also provides the meaning or function of a technical term, in which other related terms are introduced. This dependency could be used to generate stronger features for classification by using some of these terms as explained above. Human expertise added by engineers 1010 provides insights, observations and experience. Since experts normally have a very strong learning capability and high intelligence, the features generated from expertise are usually effective. They may be beneficial complements to the machine-generated features.

In the SRAR example, feature generator 1012 enhances the representation of the textual information in feature space. Domain knowledge and human expertise may be combined with the bag-of-words approach to achieve a better performance. Irrelevant classes and KN or KP classes may be identified to characterize the components of the diagnostic business process and requested experts to provide indicative patterns or features they observed when reading service requests. Some of such examples are provided in the table below.

TABLE 3

Features Provided by Experts

| Type | Feature | Class and Motivation |
| --- | --- | --- |
| Statistical features | Length of paragraph | Short paragraphs are usually irrelevant. |
| | Relative position of a paragraph in an SR (value from 0 to 1) | service requests have the latent business process "problem description → trouble shooting → action plan". |
| | Number of "%" | Error codes (relevant) begin with "%". |
| Contextual features | Contain "Hi", "Hello", "my name", or "I'm" | Introduction, irrelevant |
| | Contain "feel free", "to contact", or "have a . . . day"; begin with "Best" or "Thank" | Salutation, irrelevant |
| | Telephone number, zip code, or affiliation | Contact information, irrelevant |
| Hint words | Contain "problem", "error message" or "symptom" | Problem description |
| | Contain "suspect", "seem", "looks like", "indicate", "try", "test", or "check" | Troubleshooting |
| | Contain "recommend", "suggest", "replace", "reseat", "RMA", or "workaround" | Action plan |
| Lexical features | Number of words from ITAD | Usually relevant |
| | Product name | Usually relevant |

LM-Based SR Recommender Examples

Figure 11A:
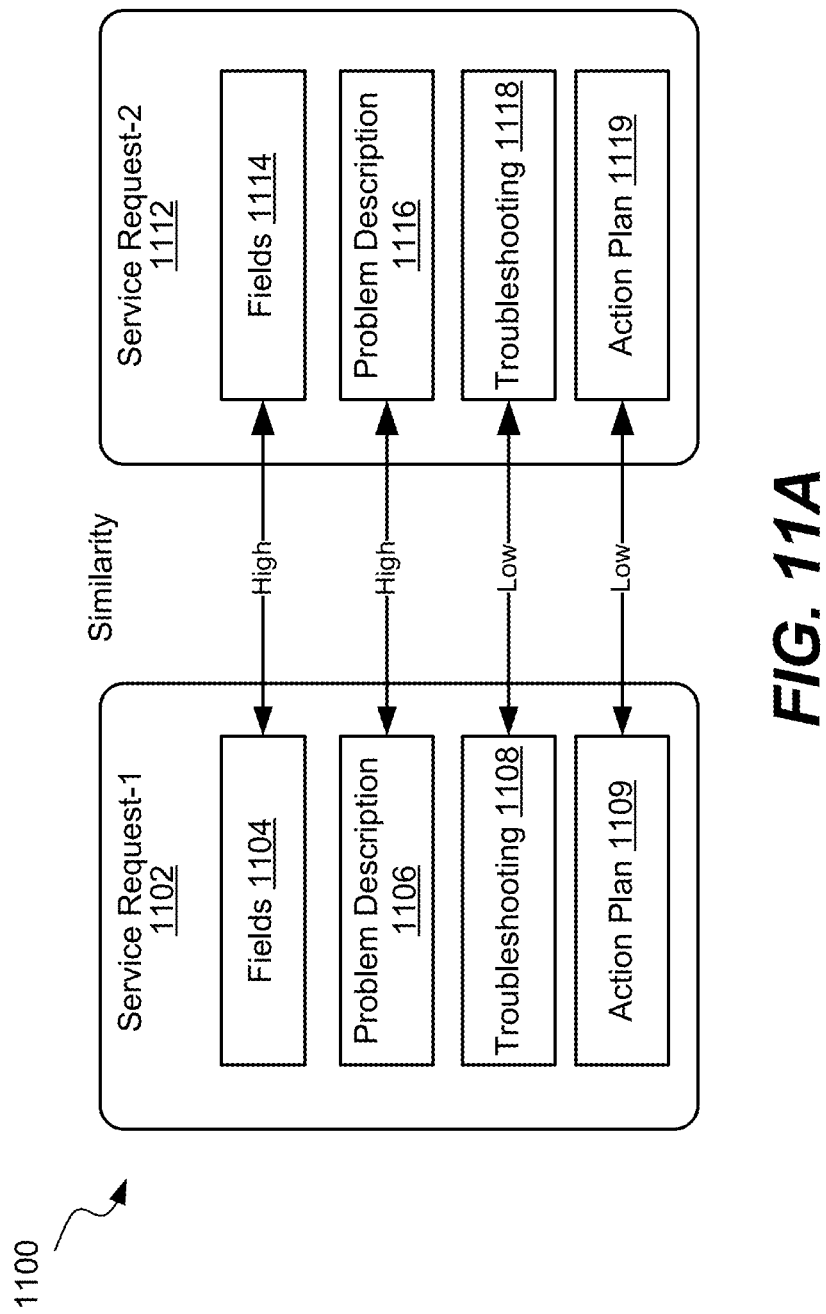
FIG. 11A depicts an example of a logic scheme of finding related service requests, in accordance with some embodiments.

In the service center example, engineers 1010 may sometimes wish to read several service requests discussing the same or similar problem so that they can understand the possible ways that such a problem had been addressed and solved in the past. Recommender 1014 may address this need and perform matching using the components of the diagnostic business process. The similarity of two service requests may be measured by evaluating the similarity between the corresponding structured fields (title, technology, and sub-technology) and granulated KN or KP categories. A specific example of this operation is illustrated in FIG. 11A. Specifically, FIG. 11A shows a logic scheme 1100 of finding related service requests 1102 and 1112. The comparison may be performed along different categories, such as fields 1104 and 1114, problem description 1106 and 1116, troubleshooting 1108 and 1118, and action plan 1109 and 1119. This example may illustrate high similarity of structured fields 1104 and 1114, which means both service requests probably discuss similar problems involving similar products and techniques. Meanwhile, if engineers wish to learn about different solutions, the recommender may measure the similarity of troubleshooting and action plan categories. A low score implies that these two service requests might have different solutions. Hence, in these problem contexts, a method to measure text similarity effectively was needed.

A model to determine the similarity of two service requests may be used based on the example illustrated in FIG. 11A. Domain knowledge may be incorporated into the model. Acronyms and terms may be expanded by the original names and explanations in ITAD so as to increase overlapping words. FIG. 11B shows an example of KN or KP excerpts from two service requests that address a similar problem with the expansion from ITAD in brackets. The overlapping words between unexpanded excerpts are marked in italics, while those introduced by ITAD are in boldface. It should be noted that the similarity can be substantially enhanced if the domain knowledge is applied.

Representing documents in vector space and computing their cosine similarity may be used to measure text similarity. The language model may be used to measure the relevance between a query and a document. The language model may be modified as an approach to measuring service request similarity. Given two pieces of text $t_1$, $t_2$, and the vocabulary $w_i$, i=1 . . . n, the generating probabilities $p(t_1|t_2)$ and $p(t_2|t_1)$ based on language models are defined below and an intuitive explanation for them follows a little further below:

$$p(t_1|t_2) = \prod_{i=1}^{n} p(w_i|t_2)^{c(w_i,t_1)}$$

and $$p(t_2|t_1) = \prod_{i=1}^{n} p(w_i|t_1)^{c(w_i,t_2)}$$

where $$p(w_1|t_j) \equiv \frac{c(w_i, t_j) + \mu \cdot p(w_i|C)}{\sum_i c(w_i, t_j) + \mu}$$

is the Dirichlet smoothed estimate of the probability, $c(w_i, t_j)$ is the number of occurrences of $w_i$ in $t_j$, and $$p(w_i|C) \equiv \frac{c(w_i, C)}{\sum_i c(w_i, C)}$$

is the maximum likelihood estimation of $w_i$ with respect to the corpus C [16]. $p(t_1|t_2)$ means the probability of generating $t_1$ from the same model that has generated $t_2$, and vice versa for $p(t_2|t_1)$. This probability represents the text relevance. Since both pieces of text may be observed and a similarity metric should have the symmetry property, the similarity metric is defined between $t_1$ and $t_2$ by a mutual generating probability as $$Sim_{LM} \equiv \frac{p(t_1|t_2) + p(t_2|t_1)}{2}$$

In some embodiments, for a given request, a ranked list of related service requests may be recommended to engineers based on the mutual generating probability defined above, where the service request with the highest value of $Sim_{LM}$ is awarded the highest recommendation. Other recommenders, incorporating content based matching or retrieval, reference based matching, or collaborative filtering based on similarity of response independent of detailed content, may also be used. These recommenders may also incorporate relevance feedback and attribution information from the user and randomized experiments. Reinforcement learning and other approaches may be used to accomplish this modification of the recommender and its output, while accounting for temporal effects.

Experimental Data

The effectiveness of the SRAR was experimentally investigated for its ability to help engineers capture the KN or KP quickly and accurately. The improvement of productivity was first measured by using the SRAR in the routine of an engineer. The service request analyzer and service request recommender may be evaluated separately. Advantages of the hierarchical classifier, the feature generator and the LM-based recommender over the benchmark approaches have been demonstrated experimentally. In all experiments, a paragraph from a service request was treated as the atomic unit to present the KN or KP. Each paragraph is classified as belonging to one of four categories, depending on the stage of the problem solving process. These four categories are (1) problem description (P), which is the text that the customer or the engineer used to describe the problem along with any documentation that supported it, (2) troubleshooting (T), which is the text concerning what the engineer requested the customer to do or tested in the lab or the customer did in the network to narrow down the problem (and may include the results of the tests as well), (3) inference (I), which is the analysis that occurred after troubleshooting to determine clearly what caused the issue and the evidence supporting it, for example, configuration issues or hardware failures, and (4) action plan (A), which is the final solution suggested to the customer, or those actions that the customer used in solving the problem, for example, software upgrades, configuration changes, and so on.

The data set included 52 service requests that the CSEs created by solving customer problems. On average each SR was 12 pages long, and some service requests even extended up to 56 pages with a very large number of "noisy" phrases and terms. After preprocessing and de-duplication, a total of 2868 paragraphs across 52 service requests were manually labeled by human expertise. Table 4 shows the skewed distribution of paragraph classes across both relevant and irrelevant classes, as a percentage of the total. The service request analyzer was evaluated using this data set as a test bed. Moreover, multiple service requests in the data set were dealing with a similar problem, and consequently the ability of the service request recommender to identify those service requests sharing the same or similar problem statement was able to be evaluated.

TABLE 4

| | Class Distribution | | | | |
|---|---|---|---|---|---|
| | Irrelevant | Relevant | | | |
| Class | (N) | P | T | I | A |
| Number of paragraphs | 1646 (57%) | 269 (9%) | 695 (24%) | 122 (4%) | 136 (5%) |

Experiments for Productivity

Since the SRAR is configured to improve the engineers' work efficiency, a comparison was made of the time (minutes) spent by engineers in reading the service request before using SRAR with the time after using it, namely reading the original service request versus reading the categorized KN or KP. The change in the length of the service request during KN or KP analysis was observed, and used it as an estimate of the resulting workload placed on the engineers. Nine device messages were chosen that had to be mapped to recommendations and measured the time required by the engineers to create them. In the initial stages of their work on a given problem, the engineers searched for the existing service requests addressing a similar problem and read them quickly to assess the relevance. If an service request was relevant, the engineers would read it thoroughly, try and understand the cause and the resolution, and consider the potential of the solution described in this service request as a candidate for the recommendation. If an service request was irrelevant or did not provide enough information, the engineers would continue looking for related service requests. Measurements were made of the time to assess the relevance of each service request and the total time to create the mapping to a solution respectively.

Figure 12:
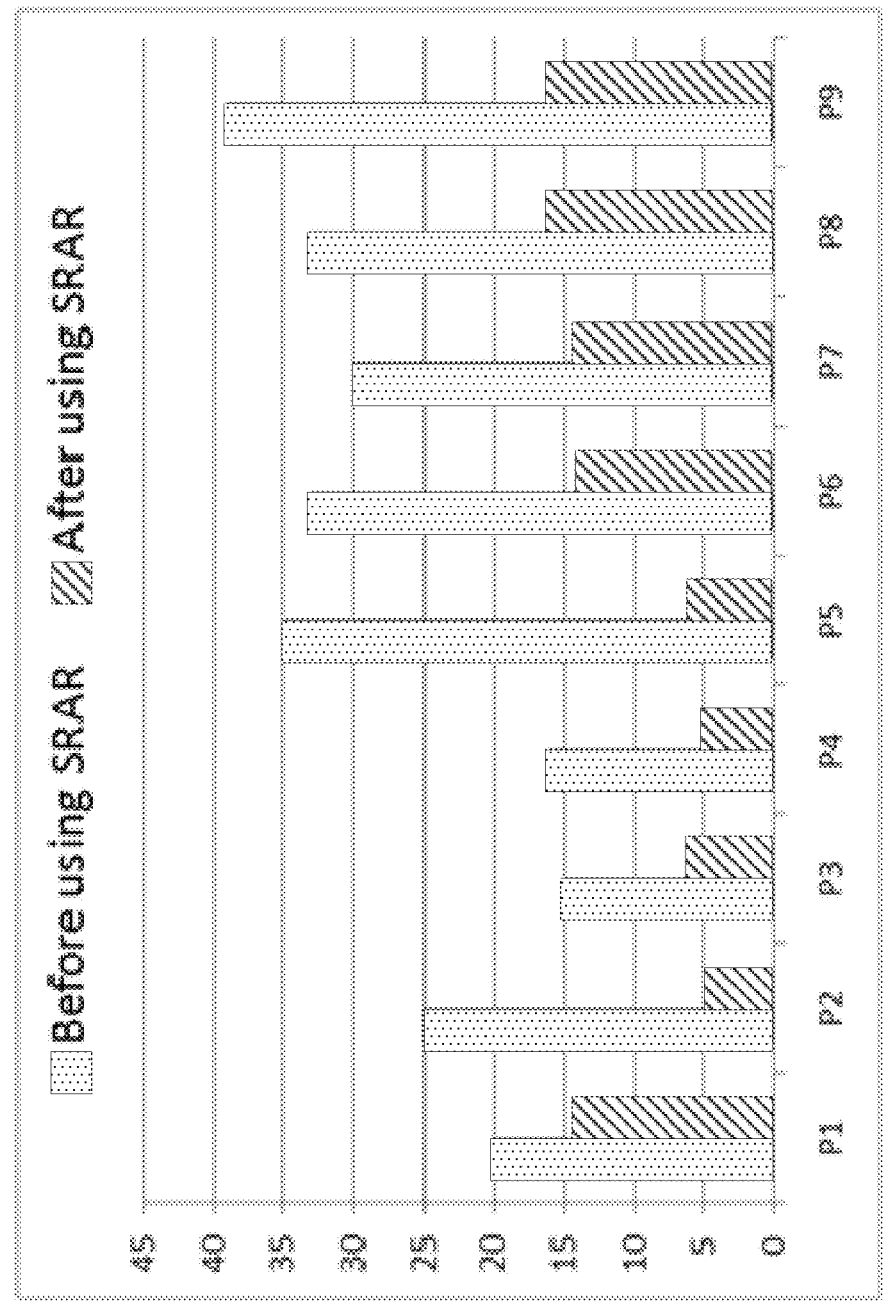
FIG. 12 illustrates example comparison of the time used to assess the relevance of different problems before and after using the SRAR.

FIG. 12 shows the comparison of the time used to assess the relevance for each of the nine given problems. On average, the time to assess the relevance of previous service requests to the current problem is reduced by 60%, from 27 minutes per service request to 11 minutes. This reduction is attributable to the de-duplication and the KN or KP categorization steps of our approach. The engineers were not distracted by the large volumes of irrelevant and noisy information and were able to flexibly work with any service request and the associated KN or KP they felt was useful in the context of their work.

Figure 13:
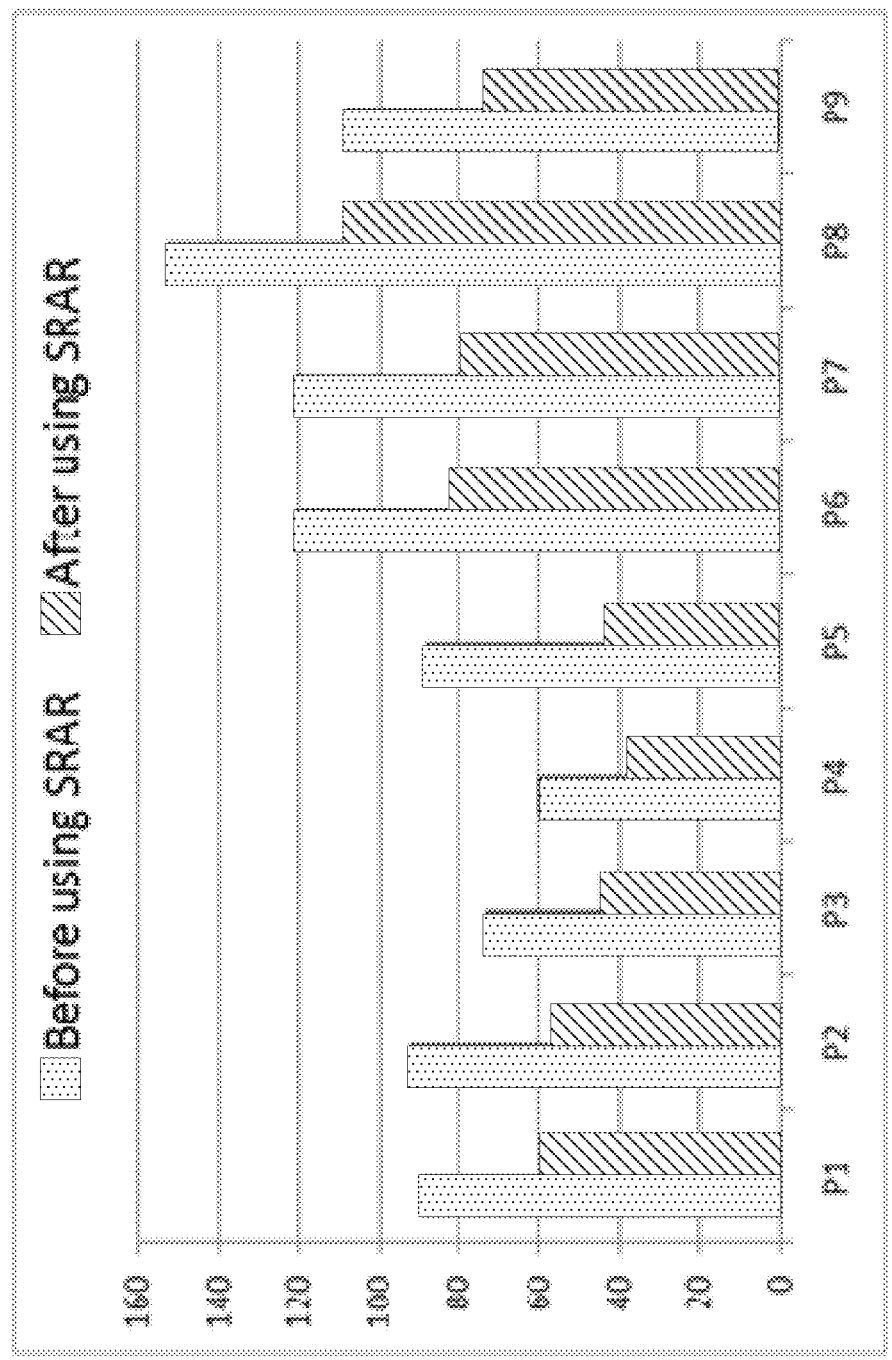
FIG. 13 illustrates example comparison of the time used to complete mapping, such to finalize Knowledge Nuggets (KN) in different problems, before and after using the SRAR.

FIG. 13 illustrates a comparison of the time used to complete the mapping, e.g., to finalize the KN or KP. Besides the time to assess relevance, it also includes the time to understand KN or KP and the time to read multiple service requests and other sources of KN or KP as needed. On average, engineers spent 97 minutes to create recommendations to a device message by reading original service requests, while it took only 67 minutes to do if they used SRAR. The productivity was improved by 45%. Extra time was saved in this process because the engineers usually read service requests back and forth, and the explicit representation of KN or KP helps them with easy tracking.

Figure 14:
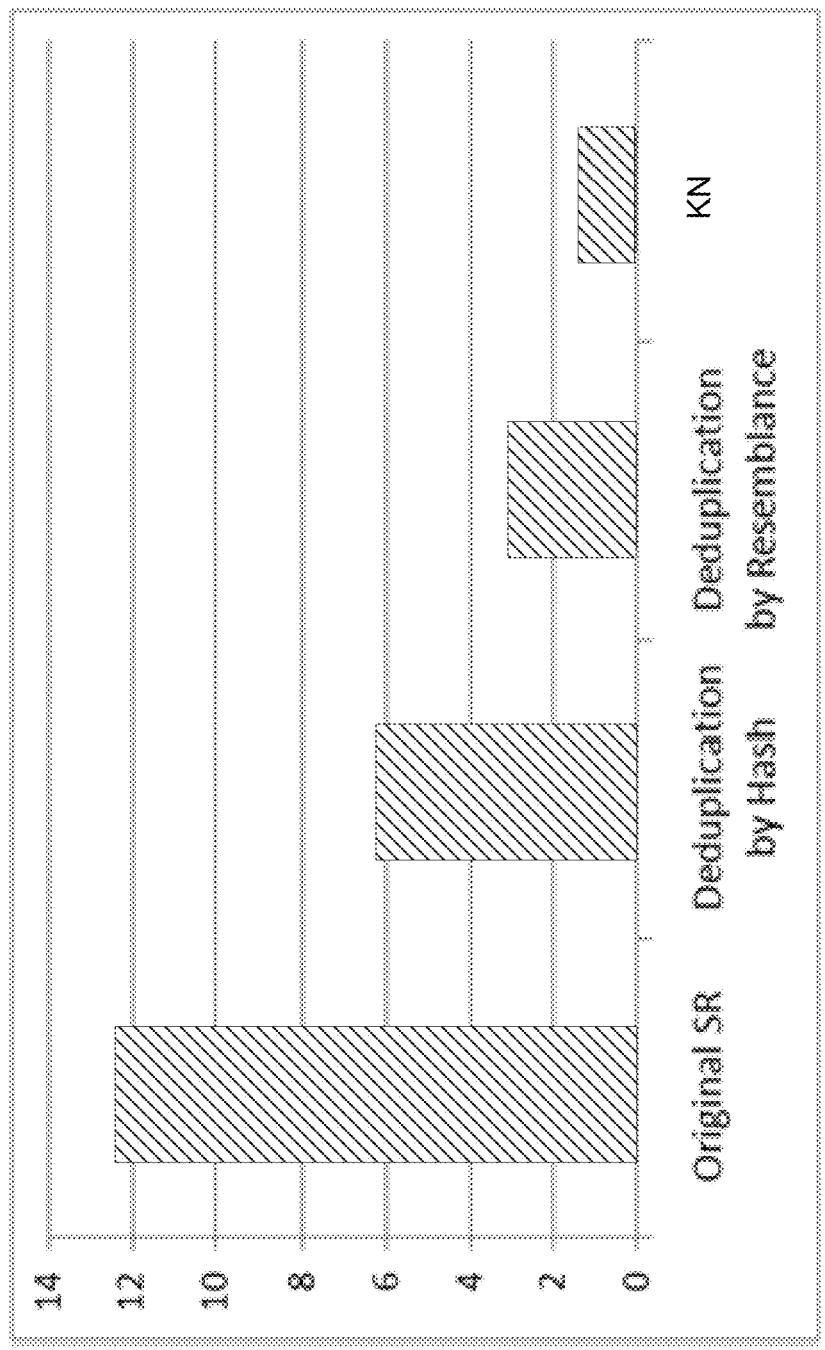
FIG. 14 depicts an illustrative average number of service request pages provided by the SRAR during a KN analysis at the points of removing duplicates and removing irrelevant information.

FIG. 14 displays the average number of service request pages given by SRAR during KN or KP Analysis at the points of removing duplicates and removing irrelevant information. Hash de-duplication was able to remove the identical duplicates and reduce the contents by 50%, but it failed to identify the near-duplicates. The resemblance method took a more flexible notion of duplication defined by similarity and reduced the service request contents by 76%, where the removed contents included the duplicate and near-duplicate information. The text remaining after the resemblance based de-duplication still contained a great deal of content irrelevant to KN or KP. Some embodiments used the developed hierarchical classifier to finally filter out almost all undesired (because of its noisy and non-informative nature) information and locate the KN or KP portion of the total text which was only 10.6% of the original SR.

Experiments on SR Analyzer

Accurate classification presents engineers with only that information which describes the essence of the service request as well as prevents KN or KP from being classified as irrelevant and hence discarded. Porter stemming and stop-words removal were applied before building an inverted index. In the feature generator, the discriminative words were chosen by the information-gain-based feature selection method. Considering the fact that nearly all words were useful features for text categorization and the capability of naive Bayes to handle high dimension data, 12,000 word features were selected expecting to improve generalization accuracy and to avoid over-fitting. Another 36 features used were suggested by experts as promising, based on their observation and work experience. Weka was adopted as the learning tool, employed the naive Bayes classifier chosen for its speed and good performance on text, used a 10-fold cross-validation to fit the model and evaluated its predictions with the labels given by experts. A "1-vs-all" approach was adopted to handle multiclass classifications. Measurements were made of the performance of classification schemes varying in structures, features, and classifiers, including Hierarchical classification (H) versus Flat classification (F), Feature Generator (FG) versus Bag-of-Words (BW), and naive Bayes (NB) versus Logistic Regression (LR). Table 5 shows the empirical results on precision, recall and F-1 measure. The "Overall" is the weighted average on all five categories, while the "KN Overall" is the weighted average on the four KN or KP categories.

Domain knowledge and human expertise indeed helped KN or KP analysis. From Table 5, H-NB-FG comprehensively outperformed H-NB-BW in all categories by F-measure. This demonstrates that the Feature Generator is superior to the traditional bag-of-words. ITAD was able to associate more words characterizing a category by expanding terminologies and thus enhanced the discriminative power of the extracted feature. Experts used their intelligence to propose insightful patterns and features. In fact, the top three effective features from information gain were all from the experts. They are the relative position of a paragraph in SR, the length of a paragraph, and the number of times that the word "problem" appeared in one paragraph.

Additionally, all hierarchical classifiers performed much better than the flat classifiers on every metric. In particular, the H-NB-FG achieved strong results. This is attributable to the hierarchical framework which reduced much of the irrelevant information at the top level and brought two benefits. Firstly, the class bias problem was avoided. This problem is quite obvious for flat classifiers, where the minor classes "I" and "A" were poorly classified, much worse than the major class "N", and even not comparable with "P" or "T". On the contrary, all KN or KP categories in hierarchical schemes were classified very accurately. Secondly, the irrelevant information that negatively affected the KN or KP classification at the bottom level was obviously reduced.

TABLE 5

Results of Different Classification Schemes

| | H-NB-FG | | | H-NB-BW | | | H-LR-BW | | |
|---|---|---|---|---|---|---|---|---|---|
| | P | R | F-1 | P | R | F-1 | P | R | F-1 |
| N | 0.907 | 0.951 | 0.929 | 0.919 | 0.927 | 0.923 | 0.895 | 0.925 | 0.910 |
| P | 0.836 | 0.699 | 0.761 | 0.760 | 0.613 | 0.679 | 0.727 | 0.587 | 0.650 |
| T | 0.797 | 0.832 | 0.814 | 0.724 | 0.837 | 0.776 | 0.748 | 0.720 | 0.734 |
| I | 0.909 | 0.738 | 0.815 | 0.726 | 0.631 | 0.675 | 0.805 | 0.639 | 0.713 |
| A | 0.862 | 0.596 | 0.704 | 0.762 | 0.471 | 0.582 | 0.783 | 0.537 | 0.637 |
| Overall | 0.872 | 0.873 | 0.871 | 0.841 | 0.842 | 0.838 | 0.834 | 0.813 | 0.822 |
| KN Overall | 0.824 | 0.767 | 0.791 | 0.736 | 0.726 | 0.723 | 0.753 | 0.662 | 0.703 |

| | F-NB-FG | | | F-LR-FG | | |
|---|---|---|---|---|---|---|
| | P | R | F-1 | P | R | F-1 |
| N | 0.791 | 0.892 | 0.838 | 0.815 | 0.891 | 0.851 |
| P | 0.413 | 0.327 | 0.365 | 0.5 | 0.368 | 0.424 |
| T | 0.582 | 0.471 | 0.520 | 0.599 | 0.535 | 0.565 |
| I | 0.279 | 0.254 | 0.266 | 0.287 | 0.303 | 0.295 |
| A | 0.183 | 0.169 | 0.176 | 0.269 | 0.235 | 0.251 |
| Overall | 0.654 | 0.676 | 0.661 | 0.685 | 0.700 | 0.692 |
| KN Overall | 0.470 | 0.384 | 0.422 | 0.509 | 0.442 | 0.473 |

Logistic regression also worked better in flat framework (F-NB-FG vs. F-LR-FG), but naïve Bayes dominated logistic regression in a hierarchical framework (H-NB-BW vs. H-LR-BW). This resulted from the removal of irrelevant content, which reduces the dependent, noisy features to alleviate the conditional independence assumption of naïve Bayes.

Experiments on SR Recommenders

The SR recommender helps to identify the service requests addressing a problem similar to that being worked on by engineers. The experiment was designed by ranking the similarity score of two service requests given by the recommender. Because the service requests that were addressing the same or similar problem were known, such service requests pairs were expected to be ranked higher in the list. Since it was not known whether all engineers require the related service requests to contain the similar problem description but different solutions, the experiment was designed for finding the related service requests without comparing the solutions. Hence only the fields and problem description paragraphs were used here. There was also interest in whether SR Analyzer could help enhance recommendation, so another experiment was performed on the original SR for comparison. The Lemur toolkit (see e.g., http://www.lemurproject.org/) was adopted to build language models, and evaluated the proposed LM-based recommender and the cosine similarity recommender by precision, recall and mean reciprocal rank (MRR). There are 1326 pairs generated by the 52 service requests, out of which 35 are related.

Figure 15:
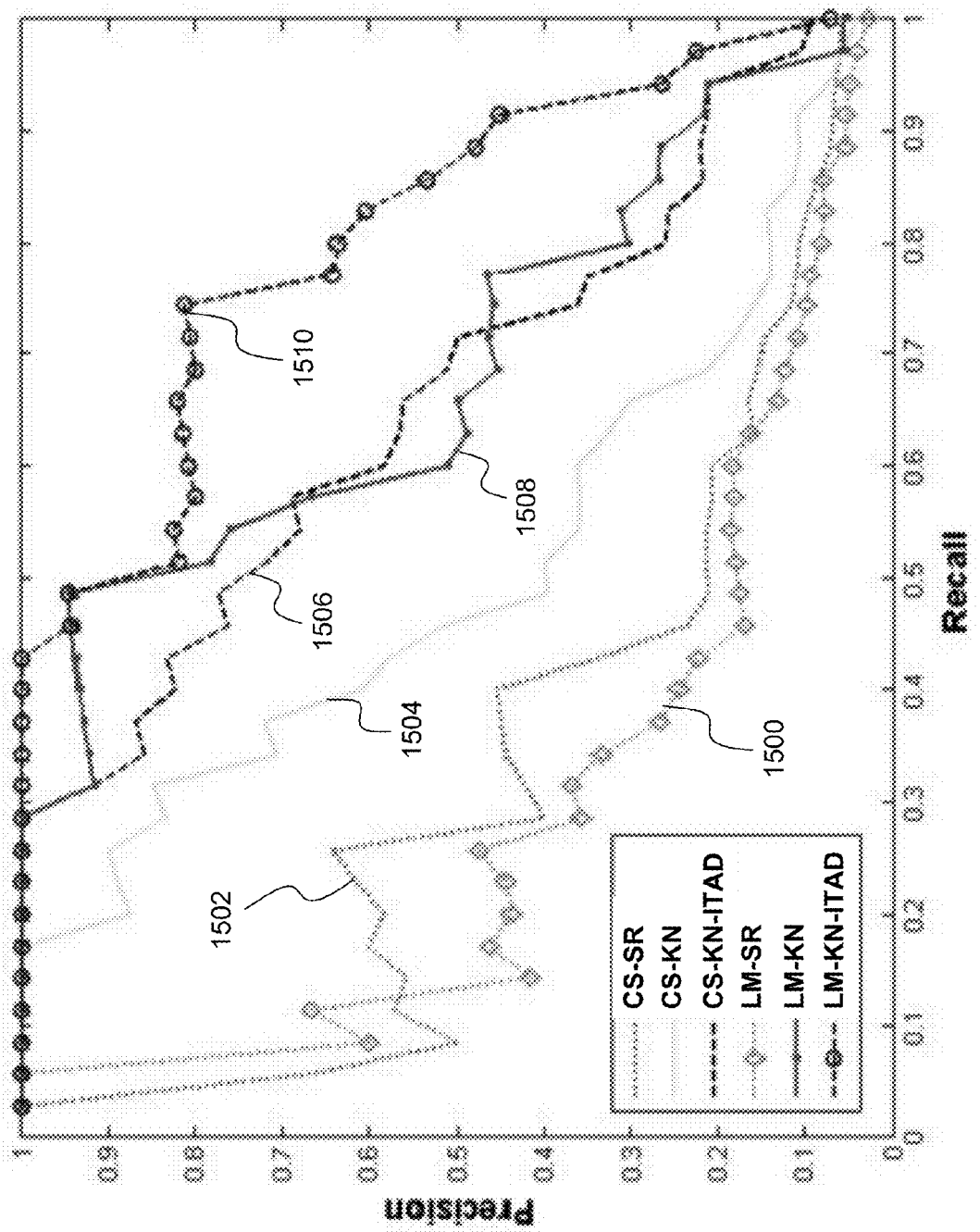
FIG. 15 depicts plots comprising precision and recall of the rank lists given by the SR recommenders using different combinations.

FIG. 15 shows the precision and recall of the rank lists given by the SR recommenders using different combinations (that is CS-SR 1502, CS-KN 1504, CS-KN-ITAD 1506, LM-SR 1500, LM-KN 1508 and LM-KN-ITAD 1510). The corresponding MRR values are 2.42, 3.36, 3.67, 2.45, 3.72 and 3.90, respectively. There were three specific findings: (1) both recommenders achieved much better results when categorized KN or KP was used. This demonstrated that SR Analyzer indeed improved the accuracy of the SR recommendation and, more importantly, validated the inherent diagnostic business process which had been hypothesized as important to the performance enhancement. (2) LM-based recommender outperformed CS recommender. All of the top 15 ranked pairs generated by LM-KN-ITAD 1510 were related pairs, while only 13 were related as indicated by CS-KN-ITAD 1506 (14 by LM-KN 1508 versus 10 by CS-KN 1504). The good performance of LM-based recommender results from that language models with Dirichlet smoothing represented the text better for similarity measurement than the vector space model. (3) Using domain-specific reference ITAD further improves retrieval results, because ITAD disambiguated the word sense and introduced more terms related to the problem so as to increase the words overlap between semantically similar documents.

The proposed systems and methods are designed based on successfully mining the diagnostic business process inherent in data. Its strong performance may be attributable to both the hierarchical classification structure and the feature generator incorporating domain knowledge and human expertise, both of which may be needed for solving specific problems in an enterprise environment. In addition, the service request recommender, as an upper layer application for information retrieval, demonstrates the strong extensibility of the system. Other applications such as information extraction may also be built on top of service analyzer to extend the system functionality for improved knowledge reuse. The synergy of service analyzer and service recommender improves the productivity in a service center environment in this example, and the system and method may be generalized to other domains and business functions that utilize textual data to improve service efficiency and productivity.

Implementation Features

Business environments include many documents associated with various business functions. These documents are organized so that information extraction for each document is based on the business process for that particular function. For instance, the business process for market positioning might include characterizing the firm and competing firms, contrasting them, and emphasizing the value of some of the firm characteristics. This allows quick extraction of the key relevant knowledge in each document, and the elimination of irrelevant information. More generally, based on an understanding of the domain (e.g., networks, health care) and the business function process, the provided systems and methods determine the types of questions and answers of interest, the associated types of knowledge structures of interest, and the types of information extraction, retrieval, and reuse approaches which might be most effective.

The Service Provisioning for Product Life (and Service) Cycle would include, but is not limited to, the following illustrative business functions, and the associated illustrative business sub-processes below for characterization and modeling, for effective information extraction and reuse. The functions include: (1) Marketing and Sales, for positioning, promotion, sales, (2) Design and Engineering, for developing design specifications, functional specs, design and engineering processes, e.g., (how a product or service is built or designed), (3) Operations for code generalization, (almost) platform independent value generation of technology in any environment, test plans, (4) Support services for remediation and event detection, diagnosis, fix, and validation cycle, and (5) Intelligent Web Community Management. Of these functions, the use of business process structure for information extraction and reuse has been described herein for the Support Service business function. Various embodiments may also be use to marketing, engineering, finance, operations, and intelligent web community management.

The methods and systems described herein allows for effective inventory of knowledge. For example, an embodiment may include novelty measures for identifying the new component of useful new knowledge, in the context of the new information coming into the service platform. Another embodiment may utilize pre-structuring. For example, with unstructured text in which "problem, cause, and correction" were all mixed together. This embodiment separates the unstructured text into fields corresponding to the business process segments such as "problem," "cause," and "correction," separately, at the time the input and document are being created. Thus, the extraction effort can be focused on identifying more refined and detailed knowledge nuggets of interest, with virtually no noise, rather than a classification approach developed to address the noisy data situation. Extensions may include situations containing several problems, each problem comprising a "problem, cause, and correction", and the components of the problems are mixed together which may result in illogical sequences.

Yet another embodiment may utilize dynamic categorization in addition to prior categorization during knowledge extraction. The dynamic categorization may be applied to new processes, categories, and topics that are not currently understood. Machine learning techniques may be used to automatically or semi-automatically generate new topics from available documents and data, to then obtain human inputs and clarification of which topics and categories are worth labeling, thus refining and distilling knowledge. The role of dynamic topic modeling is useful in facilitating this effort. For example, identifying new symptoms through mining Electronic Medical Records, thereby identifying a new disease. Similarly, the concept may be extended to identifying Network Health or Financial Health in the Financial Services industry, to warranties and maintenance services in the automobile industry, or compliance services in food and drugs.

Computer System Examples

Figure 16:
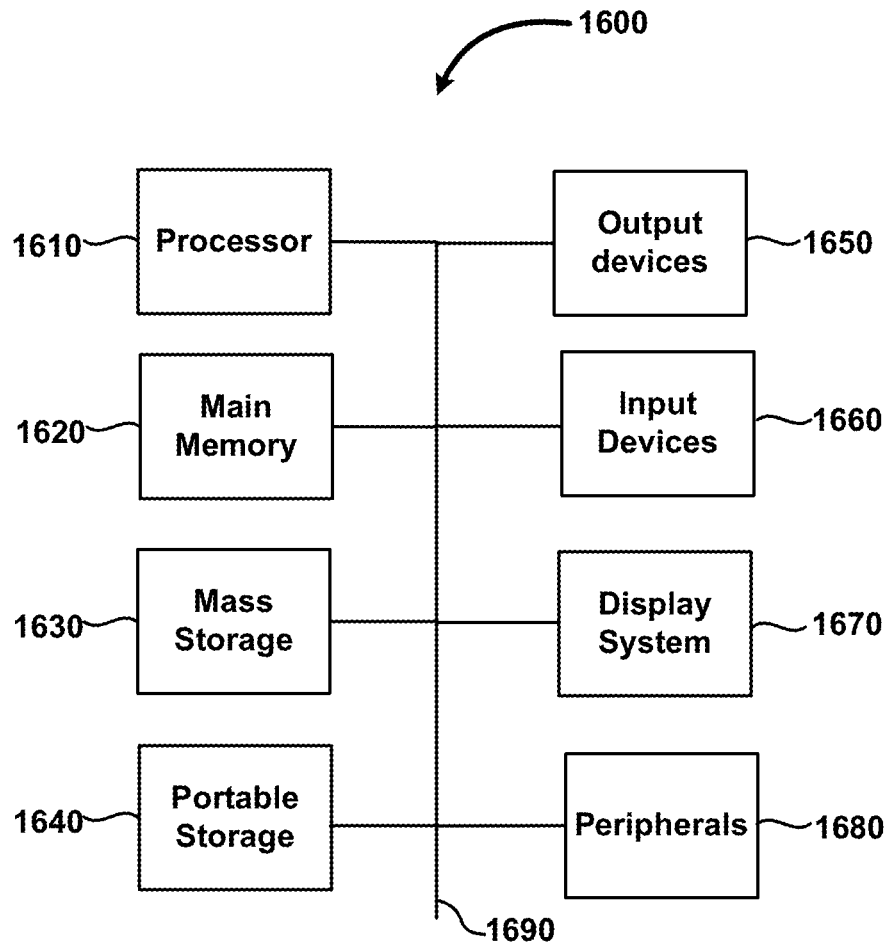
FIG. 16 depicts a computer system used for knowledge extractions, in accordance with some embodiments.

FIG. 16 illustrates an illustrative computing system 1600 that may be used to implement an embodiment of the present invention. System 1600 of FIG. 16 may be implemented in the context of user devices both mobile and nonmobile, Internet, Internet cloud (private or public), may be used for various forms of media, streaming and nonstreaming. The computing system 1600 of FIG. 16 includes one or more processors 1610 and memory 1620. Main memory 1620 stores, in part, instructions and data for execution by processor 1610. Main memory 1620 can store the executable code when the system 1600 is in operation. The system 1600 of FIG. 16 may further include a mass storage device 1630, portable storage medium drive(s) 1640, output devices 1650, user input devices 1660, a display system 1670, and other peripherals 1680.

The components shown in FIG. 16 are depicted as being connected via a single bus 1690. The components may be connected through one or more data transport means. Processor 1610 and main memory 1620 may be connected via a local microprocessor bus, and the mass storage device 1630, peripheral device(s) 1680, portable storage device 1640, and display system 1670 may be connected via one or more input/output (I/O) buses.

Mass storage device 1630, which may be implemented with a magnetic disk drive or an optical disk drive, is a non-volatile storage device for storing data and instructions for use by processor unit 1610. Mass storage device 1630 can store the system software for implementing embodiments of the present invention for purposes of loading that software into main memory 1610.

Portable storage device 1640 operates in conjunction with a portable non-volatile storage medium, such as a floppy disk, compact disk or Digital video disc, to input and output data and code to and from the computer system 1600 of FIG. 16. The system software for implementing embodiments of the present invention may be stored on such a portable medium and input to the computer system 1600 via the portable storage device 1640.

Input devices 1660 provide a portion of a user interface. Input devices 1660 may include an alpha-numeric keypad, such as a keyboard, for inputting alpha-numeric and other information, or a pointing device, such as a mouse, a trackball, stylus, or cursor direction keys. Additionally, the system 1600 as shown in FIG. 16 includes output devices 1650. Suitable output devices include speakers, printers, network interfaces, and monitors.

Display system 1670 may include a liquid crystal display (LCD) or other suitable display device. Display system 1670 receives textual and graphical information, and processes the information for output to the display device.

Peripherals 1680 may include any type of computer support device to add additional functionality to the computer system. Peripheral device(s) 1680 may include a modem or a router.

The components contained in the computer system 1600 of FIG. 16 are those typically found in computer systems that may be suitable for use with embodiments of the present invention and are intended to represent a broad category of such computer components that are well known in the art. Thus, the computer system 1600 of FIG. 16 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

CONCLUSION

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

The present technology is described above with reference to illustrative embodiments. It will be apparent to those skilled in the art that various modifications may be made and other embodiments can be used without departing from the broader scope of the present technology. Therefore, these and other variations upon the illustrative embodiments are intended to be covered by the present technology.

What is claimed is:

1. A method for knowledge extraction comprising:
receiving data;
identifying a process corresponding to the received data, the process being identified from a plurality of processes, the received data having a commonality with the process;
identifying a knowledge of the process, the knowledge corresponding to the received data;
determining categories of information for the received data utilizing the knowledge of the process;
extracting information from the received data based on the categories of information, wherein extracting information from the received data generates extracted data; and
creating records in a repository based on the extracted data, the records being adapted for use by a recommender, the recommender comprising a recommendation system.

2. The method of claim 1, wherein determining categories of information in the received data is based on a combination of the knowledge of the process and machine learning.

3. The method of claim 1, wherein the knowledge of the process comprises pattern recognition in data sources at one or more of:
at least one level of the process;
at least one level stage of the process; and
at least one level step of the process.

4. The method of claim 1, wherein the records are adapted for use by the recommender for storage and retrieval of categorized information based on a query.

5. The method of claim 1, wherein the received data comprises at least one of numerical data and structured data.

6. The method of claim 1, wherein the received data comprises unstructured data.

7. The method of claim 1, wherein the received data comprises unstructured text.

8. The method of claim 1, wherein determining categories of information for the received data is based on classification by a classifier.

9. The method of claim 1, further comprising pre-processing the received data prior to determining categories of information for the received data.

10. The method of claim 9, wherein pre-processing the received data comprises one or more operations selected from the group consisting of extracting unstructured text, separating text into paragraphs, and removing duplicates.

11. The method of claim 10, wherein removing the duplicates comprises resemblance measurements for detecting similarity between two documents.

12. The method of claim 1, wherein extracting information is performed in real time.

13. The method of claim 1, wherein the process comprises one or more of a business process, an enterprise process, a web process, a social process, and a network process.

14. The method of claim 1, further comprising retrieving the categories of information from the repository.

15. The method of claim 1, wherein the process comprises one or more of a semiconductor process, a mobile process, a telecom process, an automotive process, an aerospace process, a web process, a retail process, and an internet process.

16. The method of claim 1, wherein the process comprises expertise regarding a domain.

17. A system for knowledge extraction comprising:
a processor having a memory and executing instructions for performing a method comprising:
receiving data;
identifying a knowledge of a process corresponding to the received data;
determining categories of information for the received data utilizing the knowledge of the process;
extracting information from the received data based on the categories of information, wherein extracting information from the received data generates extracted data; and
creating records in a repository based on the extracted data, the records being adapted for use by a recommendation system.

18. A non-transitory processor-readable medium having embodied thereon instructions being executable by at least one processor to perform a method for data traffic optimization within a virtual environment, the method comprising:
receiving data;
identifying a process corresponding to the received data, the process being identified from a plurality of processes, the received data having a commonality with the process;
identifying a knowledge of the process, the knowledge corresponding to the received data;
determining categories of information for the received data utilizing the identified knowledge of a process;
extracting information from the received data based on the categories of information, wherein extracting information from the received data generates extracted data; and
creating records in a repository based on the extracted information, the records being adapted for use by a recommender.

19. The method of claim 1, wherein the recommendation system comprises a recommendation engine.

20. A method for knowledge extraction comprising:
receiving data;
identifying a process corresponding to the received data, the process being identified from a plurality of processes, the received data having a commonality with the process;
identifying a knowledge of the process, the knowledge corresponding to the received data;
determining categories of information for the received data based on a combination of the knowledge of the process and machine learning;
extracting information from the received data based on the categories of information, wherein extracting information from the received data generates extracted data; and
creating records in a repository based on the extracted data, the records being adapted for use by a recommender, the recommender comprising a recommendation engine.

* * * * *